United States Patent
Mamkina et al.

(10) Patent No.: US 11,990,127 B2
(45) Date of Patent: *May 21, 2024

(54) USER RECOGNITION FOR SPEECH PROCESSING SYSTEMS

(71) Applicant: Amazon Technologies, Inc., Seattle, WA (US)

(72) Inventors: Natalia Vladimirovna Mamkina, San Jose, CA (US); Naomi Bancroft, Sunnyvale, CA (US); Nishant Kumar, Sunnyvale, CA (US); Shamitha Somashekar, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/946,203

(22) Filed: Sep. 16, 2022

(65) Prior Publication Data

US 2023/0139140 A1 May 4, 2023

Related U.S. Application Data

(63) Continuation of application No. 16/935,523, filed on Jul. 22, 2020, now Pat. No. 11,455,995, which is a
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G06F 21/32* (2013.01); *G10L 15/01* (2013.01);
(Continued)

(58) Field of Classification Search
CPC ......... G10L 15/22; G10L 15/26; G10L 15/18; G10L 15/32; G10L 2105/223;
(Continued)

(56) References Cited

U.S. PATENT DOCUMENTS 8,909,534 B1 * 12/2014 Heath ..................... G10L 15/22
704/270.1
9,330,676 B2 * 5/2016 Hsiao ..................... G10L 15/22
(Continued)

*Primary Examiner* — Vijay B Chawan
(74) *Attorney, Agent, or Firm* — Pierce Atwood LLP

(57) ABSTRACT

Systems, methods, and devices for recognizing a user are disclosed. A speech-controlled device captures a spoken utterance, and sends audio data corresponding thereto to a server. The server determines content sources storing or having access to content responsive to the spoken utterance. The server also determines multiple users associated with a profile of the speech-controlled device. Using the audio data, the server may determine user recognition data with respect to each user indicated in the speech-controlled device's profile. The server may also receive user recognition confidence threshold data from each of the content sources. The server may determine user recognition data associated that satisfies (i.e., meets or exceeds) a most stringent (i.e., highest) of the user recognition confidence threshold data. Thereafter, the server may send data indicating a user associated with the user recognition data to all of the content sources.

20 Claims, 14 Drawing Sheets

Related U.S. Application Data continuation of application No. 16/020,603, filed on Jun. 27, 2018, now Pat. No. 10,755,709, which is a continuation of application No. 15/385,138, filed on Dec. 20, 2016, now Pat. No. 10,032,451.

(51) Int. Cl.
| | |
|---|---|
| *G06F 21/32* | (2013.01) |
| *G10L 15/01* | (2013.01) |
| *G10L 15/18* | (2013.01) |
| *G10L 15/26* | (2006.01) |
| *G10L 17/06* | (2013.01) |

(52) U.S. Cl.
CPC .............. *G10L 15/18* (2013.01); *G10L 15/26* (2013.01); *G10L 17/06* (2013.01)

(58) Field of Classification Search
CPC ....... G10L 13/033; G10L 13/02; G10L 15/04; G10L 15/06; G10L 15/063; G10L 15/07; G10L 15/08; G10L 15/1822; G10L 15/187; G10L 15/19; G10L 15/197; G10L 15/265; G10L 15/30; G06F 3/167; G06F 40/274; G06F 40/30787

See application file for complete search history.

(56) References Cited

U.S. PATENT DOCUMENTS

| | | | | |
|---|---|---|---|---|
| 9,730,073 | B1* | 8/2017 | Kuehnel | H04W 12/50 |
| 9,875,081 | B2* | 1/2018 | Meyers | G10L 15/00 |
| 9,972,339 | B1* | 5/2018 | Sundaram | G01S 3/8083 |
| 10,032,451 | B1* | 7/2018 | Mamkina | G06F 21/32 |
| 10,074,371 | B1* | 9/2018 | Wang | G10L 15/08 |
| 10,373,612 | B2* | 8/2019 | Parthasarathi | G10L 15/02 |
| 10,755,709 | B1* | 8/2020 | Mamkina | G06F 3/167 |
| 11,455,995 | B2* | 9/2022 | Mamkina | G10L 15/26 |
| 2006/0149558 | A1* | 7/2006 | Kahn | G10L 15/063 |
| | | | | 704/278 |
| 2006/0184370 | A1* | 8/2006 | Kwak | G10L 15/1822 |
| | | | | 704/275 |
| 2008/0255848 | A1* | 10/2008 | Yu | G10L 15/26 |
| | | | | 704/270.1 |
| 2012/0010884 | A1* | 1/2012 | Kocks | G06F 16/784 |
| | | | | 704/240 |
| 2012/0053942 | A1* | 3/2012 | Minamino | G10L 15/32 |
| | | | | 704/E15.001 |
| 2012/0096481 | A1* | 4/2012 | Sano | G06F 3/167 |
| | | | | 725/12 |
| 2012/0173464 | A1* | 7/2012 | Tur | G06N 20/00 |
| | | | | 706/11 |
| 2014/0309990 | A1* | 10/2014 | Gandrabur | G10L 15/1815 |
| | | | | 704/9 |
| 2015/0039307 | A1* | 2/2015 | Jeon | G10L 15/22 |
| | | | | 704/235 |
| 2015/0314454 | A1* | 11/2015 | Breazeal | G10L 15/32 |
| | | | | 700/259 |
| 2015/0370319 | A1* | 12/2015 | Alleaume | G06F 3/0482 |
| | | | | 345/156 |
| 2016/0379638 | A1* | 12/2016 | Basye | G10L 15/22 |
| | | | | 704/235 |
| 2017/0083285 | A1* | 3/2017 | Meyers | G10L 15/00 |
| 2017/0270919 | A1* | 9/2017 | Parthasarathi | G10L 17/06 |
| 2018/0210703 | A1* | 7/2018 | Meyers | G10L 15/32 |
| 2020/0035231 | A1* | 1/2020 | Parthasarathi | G10L 25/87 |

* cited by examiner

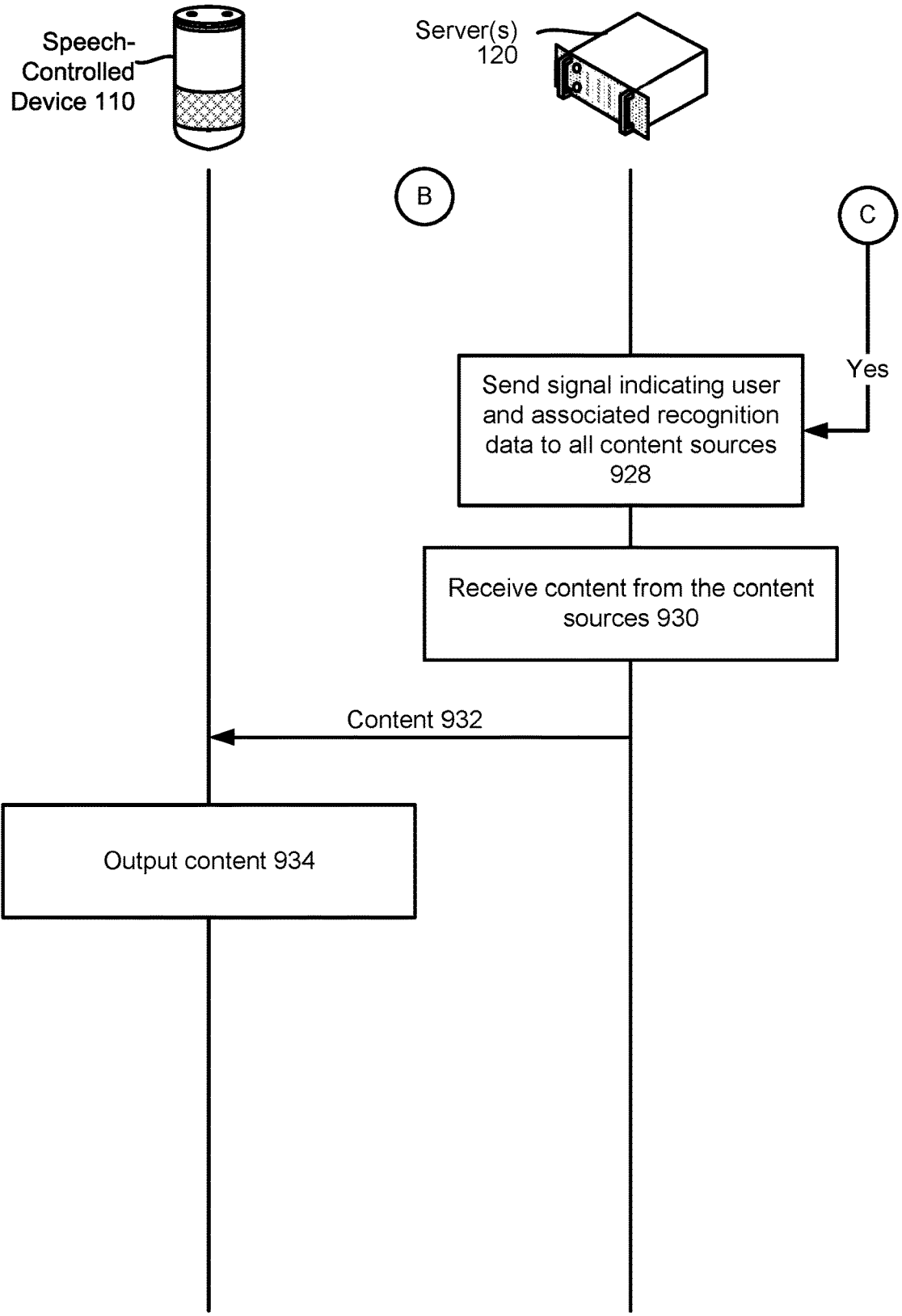

USER RECOGNITION FOR SPEECH PROCESSING SYSTEMS

CROSS REFERENCE TO RELATED APPLICATION

This application is a continuation of, and claims priority to U.S. Non-Provisional patent application Ser. No. 16/935,523, entitled "USER RECOGNITION FOR SPEECH PROCESSING SYSTEMS," filed Jul. 22, 2020, which is scheduled to issue as U.S. Pat. No. 11,455,995, and which is a continuation of and claims priority to U.S. Non-Provisional patent application Ser. No. 16/020,603, filed Jun. 27, 2018 and entitled "USER RECOGNITION FOR SPEECH PROCESSING SYSTEMS," which issued as U.S. Pat. No. 10,755,709, which is a continuation of and claims priority to U.S. Non-Provisional patent application Ser. No. 15/385,138, filed Dec. 20, 2016 and entitled "USER RECOGNITION FOR SPEECH PROCESSING SYSTEMS," in the names of Natalia Vladimirovna Mamkina et al., which issued as U.S. Pat. No. 10,032,451, each of which is herein incorporated by reference in its entirety.

BACKGROUND

Speech recognition systems have progressed to the point where humans can interact with computing devices by speaking. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 9A through 9C are a signal flow diagram illustrating determining output content based on user recognition according to embodiments of the present disclosure.

DETAILED DESCRIPTION

Figure 1:
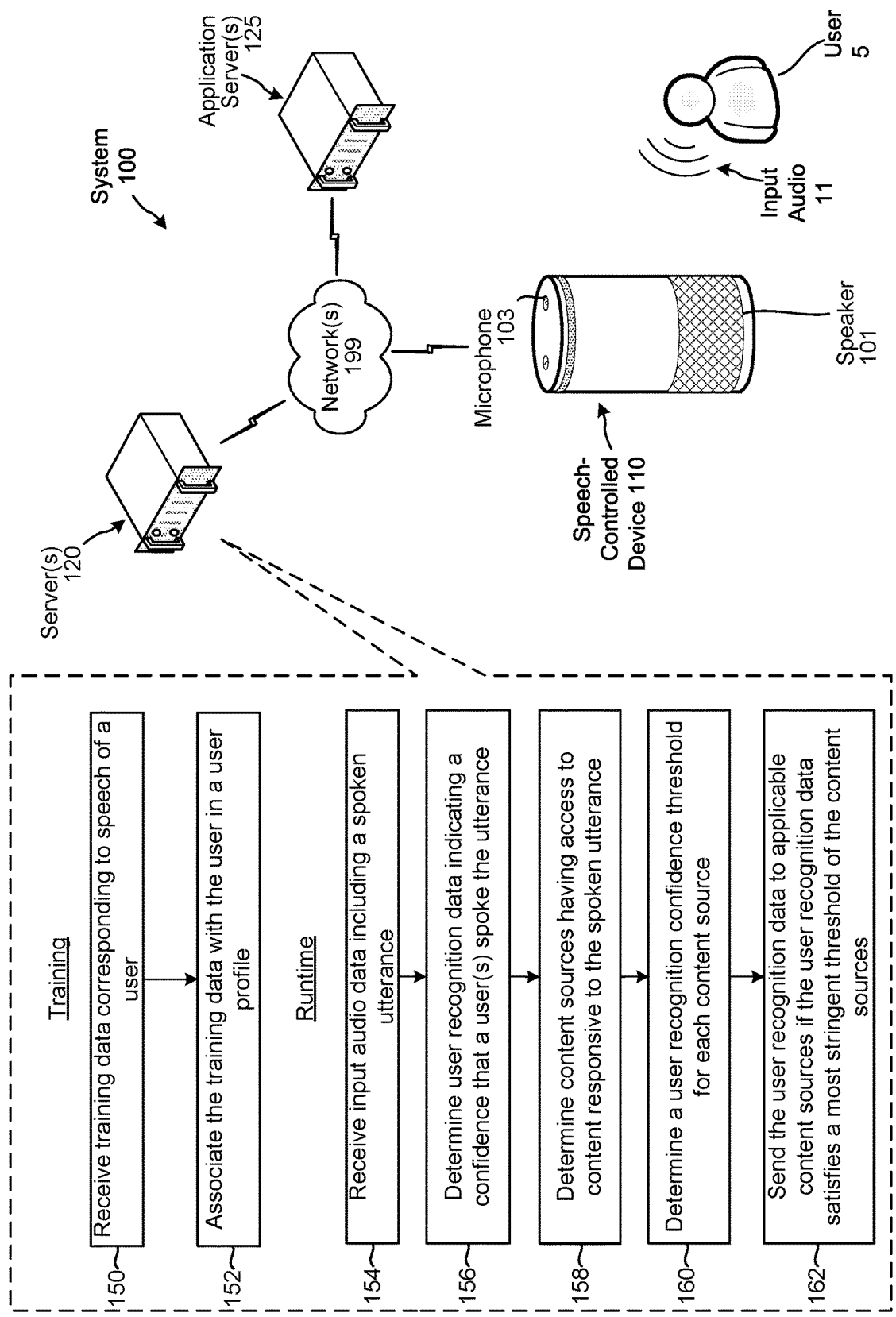
FIG. 1 illustrates a system for recognizing a user that speaks an utterance according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Speech processing systems have become robust platforms enabled to perform a variety of speech related tasks such as playing music, controlling household devices, communicating with other users, shopping, etc. Speech processing systems may process a spoken utterance to obtain content responsive thereto (for example output music, news content, or the like). Speech processing systems may also process a spoken utterance, and therefrom perform TTS processing to create computer-generated speech responsive to the spoken utterance thus enabling the system to engage in a conversation with a user and provide feedback and prompts in spoken form. For example, a user may speak a request to play music and the system may respond, in a spoken form "playing music" before actually outputting the music content.

Some speech processing systems have access to multiple content sources storing or having access to content responsive to spoken utterances. Each content source may have a respective user recognition confidence threshold that must be satisfied prior to the content source providing access to the requested content. Identification of a user refers to determining an identity of a user. Verification refers to confirming a previously determined identity of a user. Recognition of users refers to both identification and verification of a user. Various levels of user recognition (e.g., the system's confidence that the user corresponds to a user profile, like "John Smith") may be determined using different combinations of user recognition techniques. For example, voice analysis on input audio data may be used to recognize the user. Facial recognition may also be used to recognize the user. Still other techniques such as input of a password, spoken passphrase, retina scan, fingerprint scan, etc. may also be used to recognize the user. Certain single techniques, or combinations of techniques, may result in the system having a higher confidence that the user corresponds to a particular identity. As can be appreciated, however, the more such techniques are required, the more the user may need to do to recognize himself/herself. Such recognitions may add friction to the user's interaction with the system and may be undesirable in certain circumstances.

Further, the user recognition confidence threshold to interact with different content sources may be different. For example, a speech processing system may be capable of generating output content in the form of various system-generated prompts using TTS that address the user by name such as "playing your music John," or the like. To generate such name-specific responses the system may require some low level of confidence that the user is John. The speech processing system may also be able to connect to a variety of other services such as music playing services and/or a banking service. The music playing services may send music data to the system if the system is mostly confident that the requesting user is who the system thinks the user is (and the user has an account with the music service). The banking service, on the other hand, may be willing to send data regarding branch locations to anyone but may only be willing to send balance information if the system is very confident that the requesting user is who the system thinks the user is (and the profile associated with the user indicates it is authorized to access the appropriate bank account). These different levels of confidence may correspond to different system or third-party settings depending on the content desired, third party rules, etc.

In particular, certain single utterances may include a command that would result in multiple pieces of output content. For example, an utterance invoking a banking application may result in a request to the banking application for output content related to an account balance as well as a request for system generated TTS output content acknowledging the request (e.g., "obtaining your checking account balance John"). If, however, the system has only a medium confidence of the user's identity (i.e., that the user is "John"), then the system may be able to generate the customized TTS content (as that requires low user recognition confidence) but may not be able to obtain the account balance information (as that may require high user recognition confidence). This may result in the system returning a TTS prompt soliciting further user recognition needed to access the account information, but such a TTS prompt may end up being personalized due to the low confidence needed for a personalized TTS prompt. Thus the user may be output a TTS response such as "John, while I am pretty sure it is you, I need to be certain before granting access to your account. Please provide [specific information] for verification purposes." While such a message may be acceptable from the machine, embodiments described herein can be used to enable more sophisticated machine-based interactions with the user.

The present disclosure improves traditional speech processing systems by, among other things, grouping the content sources (e.g., NLU domains) needed to respond to or otherwise process a single utterance, determining a level of user verification (if any) that will be needed by each content source, and performing user recognition with respect to a most stringent user recognition confidence threshold of the content source(s). Thus, when a single spoken utterance results in content from multiple content sources, where each content source has a respective user recognition confidence threshold that must be satisfied, the system may refrain from outputting user-customized content in response to the utterance unless the highest user recognition confidence threshold of the grouped content sources can be satisfied. The system may perform user recognition and provide all the invoked content sources with an indication of user recognition only if the most stringent user recognition confidence threshold of the content sources is satisfied. This may decrease a likelihood of undesirable operation of the speech processing system without increasing unintentional disclosure of data to unauthorized users. Alternatively, the system can provide a customized response if the confidence value exceeds the personalized response threshold and explain to the user that additional level of confidence is needed to meet the highest user verification confidence threshold of the grouped content sources needed to fully process the inquiry.

FIG. 1 illustrates a system 100 configured to recognize a user according to the present disclosure. Although the figures and discussion illustrate certain operational steps of the system 100 in a particular order, the steps described may be performed in a different order (as well as certain steps removed or added) without departing from the intent of the disclosure. As shown in FIG. 1, the system 100 may include a speech-controlled device 110 local to a user 5, and a server(s) 120 connected to the speech-controlled device 110 across a network(s) 199. The server(s) 120 (which may be one or more different physical devices) may be capable of performing speech processing (e.g., ASR, NLU, command processing, etc.), TTS processing, and user recognition as described herein. A single server 120 may perform all speech processing, TTS processing, and user recognition. Alternatively, multiple servers 120 may combine to perform all speech processing, TTS processing, and user recognition. Further, the server(s) 120 may execute certain commands, such as answering spoken utterances of the user 5. In addition, certain speech detection or command execution functions may be performed by the speech-controlled device 110.

As illustrated in FIG. 1, during a training phase, the speech-controlled device 110 may capture various speech (i.e., input audio 11) of the user 5 via a microphone 103 of the speech-controlled device 110. For example, capturing of the training speech may occur as part of enrolling the user with the speech-controlled device 110/system 100. The speech-controlled device 110 may then send training data corresponding to the training speech to the server(s) 120. Alternatively, a microphone array (not illustrated), separate from the speech-controlled device 110, may capture the training speech. In an example, the microphone array is in direct communication with the speech-controlled device 110 such that when the microphone array captures the training speech, the microphone array sends the training data to the speech-controlled device 110. The speech-controlled device 110 may then forward the received training data to the server(s) 120. In another example, the microphone array is in indirect communication with the speech-controlled device 110 via a companion application of a mobile computing device, such as a smart phone, tablet, laptop, etc. In this example, when the microphone array captures the training speech, the microphone array sends the training data to the companion application, which forwards the training data to the speech-controlled device 110. The speech-controlled device 110 may then forward the training data to the server 120. In yet another example, the microphone array is in indirect communication with the server 120 via the companion application such that when the microphone array captures the training speech, the microphone array sends the training data to the companion application, which forwards the training data to the server 120.

The server(s) 120 receives (150) the training data and associates (152) the training data with the user 5 in a user profile associated with the speech-controlled device 110 from which the training data originated. It should be appreciated that the server(s) 120 may receive (150) training data from multiple speech-controlled devices 110 of the system, and may store the training data with respective users and user profiles.

The server(s) 120 may simply store, in the user profile, waveforms of training data without determining features/vectors of the training data. In this example, features/vectors of the training data may be determined each time the server(s) 120 attempts to compare features/vectors of a spoken utterance to the training data. Alternatively, upon receiving (150) training data, the server(s) 120 may determine features/vectors of the training data and associate (152) the features/vectors with the user in the user profile. This allows the server(s) 120 to only determine the features/vectors of the training data once, thereby negating duplicative processing.

During runtime, as shown in FIG. 1, the microphone 103 of the speech-controlled device 110 (or a separate microphone array depending upon implementation) captures an utterance (i.e., input audio 11) spoken by the user 5. The server(s) 120 receives (154) input audio data including the spoken utterance from the speech-controlled device 110 or a companion application (depending upon implementation as described herein above). The server(s) 120 may determine (156) user recognition data indicating a confidence that a particular user(s) of the speech-controlled device 110 spoke the utterance. The server(s) 120 may also determine (158) multiple content sources storing or having access to content responsive to the spoken utterance. For example, a single spoken utterance of "What is the weather?" may call for one content source to determine the weather data (e.g., sunny) and another content source to create a TTS result to personalize a response to the user presenting the weather data (e.g., "Hi John, it is presently sunny"). The server(s) 120 may determine (160) a user recognition confidence threshold associated with each of the determined content sources. The user recognition confidence thresholds may be established during a training phase of the system 100. A user recognition confidence threshold may be adjusted during runtime of the system 100. For example, if a user recognition confidence threshold is routinely not satisfied during runtime, the system 100 may decrease the threshold, and vice versa. A first content source (e.g., the TTS response generator) may be configured to provide content related to the greeting "Hi John" while a second content source (e.g., a weather application server 125) may be configured to provide content related to "it is presently sunny." The first content source may require a first user recognition confidence threshold based on the specificity of the greeting (i.e., the greeting being specific to the present user of the speech-controlled device 110, that is "John") while the second content source may require a second, lower user recognition confidence threshold. The server(s) 120 may receive indicators of the respective user recognition confidence thresholds from each respective content source in the form of user recognition confidence threshold data. Alternatively, the server(s) 120 may determine a user recognition confidence threshold of each content source by accessing a storage including user recognition confidence threshold data associated with respective content sources. The server(s) 120 may send (162) the determined user recognition data to all of the determined content sources (i.e., the content sources having access to content responsive to the spoken utterance) only if the user recognition data satisfies a most stringent user recognition confidence threshold of the content sources used to satisfy a command of the utterance (e.g., a request for weather data). For example, if a first content source has a user recognition confidence threshold of low, a second content source has a user recognition confidence threshold of medium and a third content source has a user recognition confidence threshold of high, the server(s) 120 may only send the determined user recognition data to the first content source, the second content source, and the third content source if the determined user recognition data includes a user recognition confidence of "high" or higher. If the most stringent user recognition confidence threshold is not met, the system may still execute the command of the utterance, however it may do so without certain user-customized operations that may otherwise have been performed. Thus while certain content data may still be output to the user, it may not be as personalized to the user as it might have been if the confidence was higher. (For example, weather data may be returned, but the system may not address the user by name when reading out the weather data.)

As described above, user recognition may be performed using training data captured while enrolling the user with the system 100/speech-controlled device 110. However, it should be appreciated that user recognition may be performed without using training data captured during an enrollment process. For example, reference data used to perform user recognition may be captured during runtime (i.e., when the user interacts with the system 100 at runtime by, for example, speaking commands).

Figure 2:
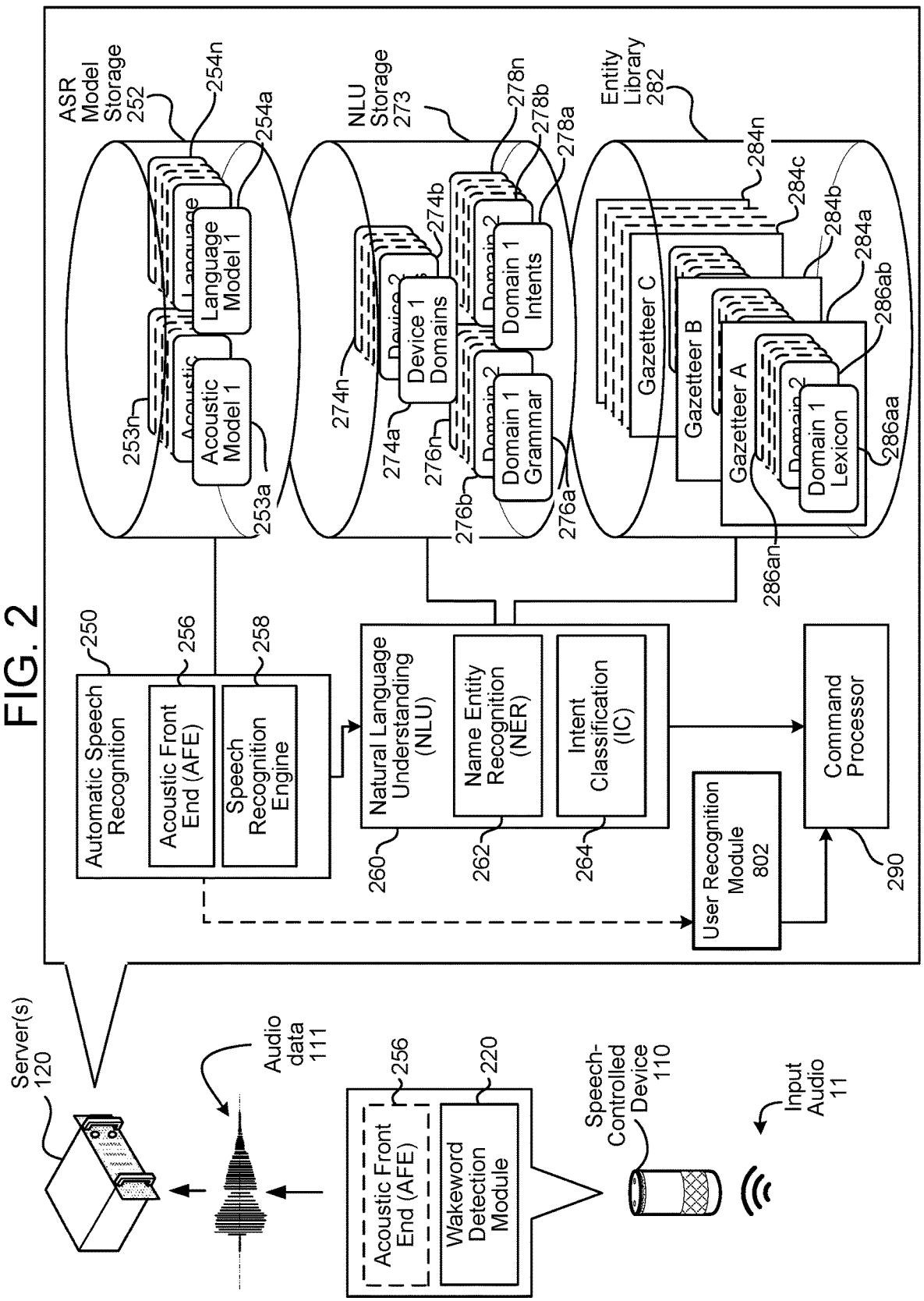
FIG. 2 is a conceptual diagram of how a spoken utterance may be processed according to embodiments of the present disclosure.

Further details of the system 100 configured to verify a user that speaks an utterance are explained below, following a discussion of the overall speech processing system of FIG. 2. The system 100 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as the microphone 103 of the speech-controlled device 110 (or other device), captures input audio 11 corresponding to a spoken utterance. The device 110, using a wakeword detection module 220, then processes audio data corresponding to the input audio 11 to determine if a keyword (such as a wakeword) is detected in the audio data. Following detection of a wakeword, the speech-controlled device 110 sends audio data 111, corresponding to the utterance, to a server 120 that includes an ASR module 250. The audio data 111 may be output from an acoustic front end (AFE) 256 located on the device 110 prior to transmission, or the audio data 111 may be in a different form for processing by a remote AFE 256, such as the AFE 256 located with the ASR module 250.

The wakeword detection module 220 works in conjunction with other components of the device 110, for example the microphone 103 to detect keywords in audio data corresponding to the input audio 11. For example, the device 110 may convert input audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in input audio based on various quantitative aspects of the input audio, such as a spectral slope between one or more frames of the input audio; energy levels of the input audio in one or more spectral bands; signal-to-noise ratios of the input audio in one or more spectral bands; or other quantitative aspects.

In other embodiments, the device 110 may implement a limited classifier configured to distinguish speech from background noise. The classifier may be implemented by techniques such as linear classifiers, support vector machines, and decision trees. In still other embodiments, Hidden Markov Model (HMI) or Gaussian Mixture Model (GMM) techniques may be applied to compare the input audio to one or more acoustic models in speech storage, which acoustic models may include models corresponding to speech, noise (such as environmental noise or background noise), or silence. Still other techniques may be used to determine whether speech is present in the input audio.

Once speech is detected in the input audio, the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each wakeword and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN)-HMM decoding framework. In another embodiment the wakeword spotting system may be built on DNN/recursive neural network (RNN) structures directly, without HMM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data corresponding to the wakeword may be removed by the local device 110 prior to sending the audio data 111 to the server 120.

Upon receipt by the server(s) 120, an ASR module 250 may convert the audio data 111 into text data. The ASR module 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR module 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a respective probability/confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR module 250 outputs the most likely text recognized in the audio data 111. The ASR module 250 may also output multiple hypotheses in the form of a lattice or an N-best list with each hypothesis corresponding to a confidence score or other score (e.g., such as probability scores, etc.).

The device or devices including the ASR module 250 may include an AFE 256 and a speech recognition engine 258. The AFE 256 transforms the audio data 111 into data for processing by the speech recognition engine 258. Such transformation is discussed in further detail with regard to FIG. 6 below. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. In one configuration each audio frame includes 25 ms of audio and the frames start at 10 ms intervals resulting in a sliding window where adjacent audio frames include 15 ms of overlapping audio. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-controlled device 110 may process audio data 111 into feature vectors (e.g., using an on-device AFE 256) and transmit the feature vector data to the server 120 across the network 199 for ASR processing. Feature vector data may arrive at the server 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 250 will output speech results that make sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.). For example, the ASR component 250 may output text data 300 for further processing by an NLU 260, where the text data 300 may include a single top scoring hypothesis or a N-best list including multiple hypotheses. Further, the ASR component 250 may output ASR confidence score data 807 for further processing by a user verification module 802 (discussed below) or other component. The ASR confidence score data 807 may include a respective score for each hypothesis in an N-best list or may include a single score for the top hypothesis output as the text data 300. In other configurations the ASR confidence score data 807 may include general confidence data, such as one or more values that indicate how generally confident the ASR component 250 was in its processing, without necessarily linking that confidence to a specific hypothesis. The ASR confidence score data 807 may be based on various factors such as audio quality, whether the hypotheses had similar scores or whether one hypothesis largely outscored the others, or other factors.

The device performing NLU processing (e.g., the server 120) may include various components, including potentially dedicated processor(s), memory, storage, etc. The device performing NLU processing may include a dedicated NLU module/component 260, which may include a named entity recognition (NER) module 262, and intent classification (IC) module 264. The device performing NLU processing may additionally include NLU storage 273, and a knowledge base (not illustrated). The knowledge base is a database or other information storage that may include information about entities that may be used in resolving spoken utterances. The NLU module 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways.

The NLU module 260 takes text data (e.g., output from the ASR module 250 based on the input audio data 111) and attempts to make a semantic interpretation of the text data. That is, the NLU module 260 determines the meaning behind the text data based on the individual words and then implements that meaning. The NLU module 260 interprets a text string to derive an intent or a desired action from the user as well as the pertinent pieces of information in the text data that allow a device (e.g., the speech-controlled device 110, the server 120, an application server, etc.) to complete that action. For example, if a spoken utterance is processed using the ASR module 250, which outputs the text data "call mom", the NLU module 260 may determine the user intended to activate a telephone in his/her device and to initiate a call with a contact matching the entity "mom."

The NLU module 260 may process several textual inputs related to the same utterance. For example, if the ASR module 250 outputs N text segments (e.g., as part of an N-best list), the NLU module 260 may process all N outputs to obtain NLU results.

The NLU module 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU module 260 may be configured to determine a "domain" of the utterance so as to determine and narrow down which services offered by an endpoint device (e.g., the server 120, the speech-controlled device 110, an application server, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER module 262 receives an utterance in the form of ASR results and attempts to identify relevant grammars and lexical information that may be used to construe meaning. To do so, the NER module 262 may begin by identifying potential domains that may relate to the received utterance. The NLU storage 273 includes a database of domains 274 associated with specific devices. For example, the speech-controlled device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored, with the overall highest ranked result from all applied domains being ordinarily selected to be the correct result. This is described further in detail below in reference to FIG. 3.

An IC module 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC module 264 identifies potential intents for each identified domain by comparing words in the utterance to the words and phrases in the intents database 278.

In order to generate a particular interpreted response, the NER module 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the spoken utterance to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER module 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (i.e., in the NLU storage 273). For instance, if the utterance was "play songs by the rolling stones," after failing to determine an album name or song name called "songs" by "the rolling stones," the NER module 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the speech-controlled device 110 "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the ASR component 250 may be sent to a user recognition module 802. The user recognition module 802 performs user recognition using the audio data 111, and optionally the ASR component output. The user recognition module 802 may include a scoring component that determines respective scores indicating whether the input utterance in the audio data 111 was spoken by particular users. The user recognition module 802 may also include a confidence component that determines an overall confidence as the accuracy of user recognition operations.

The output from the NLU processing, which may include tagged text data, commands, etc., and output from the user recognition module 802 (e.g., user recognition confidence data) may then be sent to a command processor 290, which may be located on a same or separate server 120 as part of the system 100. The system 100 may include more than one command processor 290, and the command processor 290 may be determined based on the NLU output. For example, if the NLU output includes a command to play music, the command processor 290 selected may correspond to a music playing application, such as one located on the speech-controlled device 110 or in a music playing appliance, configured to execute a music playing command. Many such command processors 290 may be available to the system depending on the various applications that may be invoked. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

Figure 3:
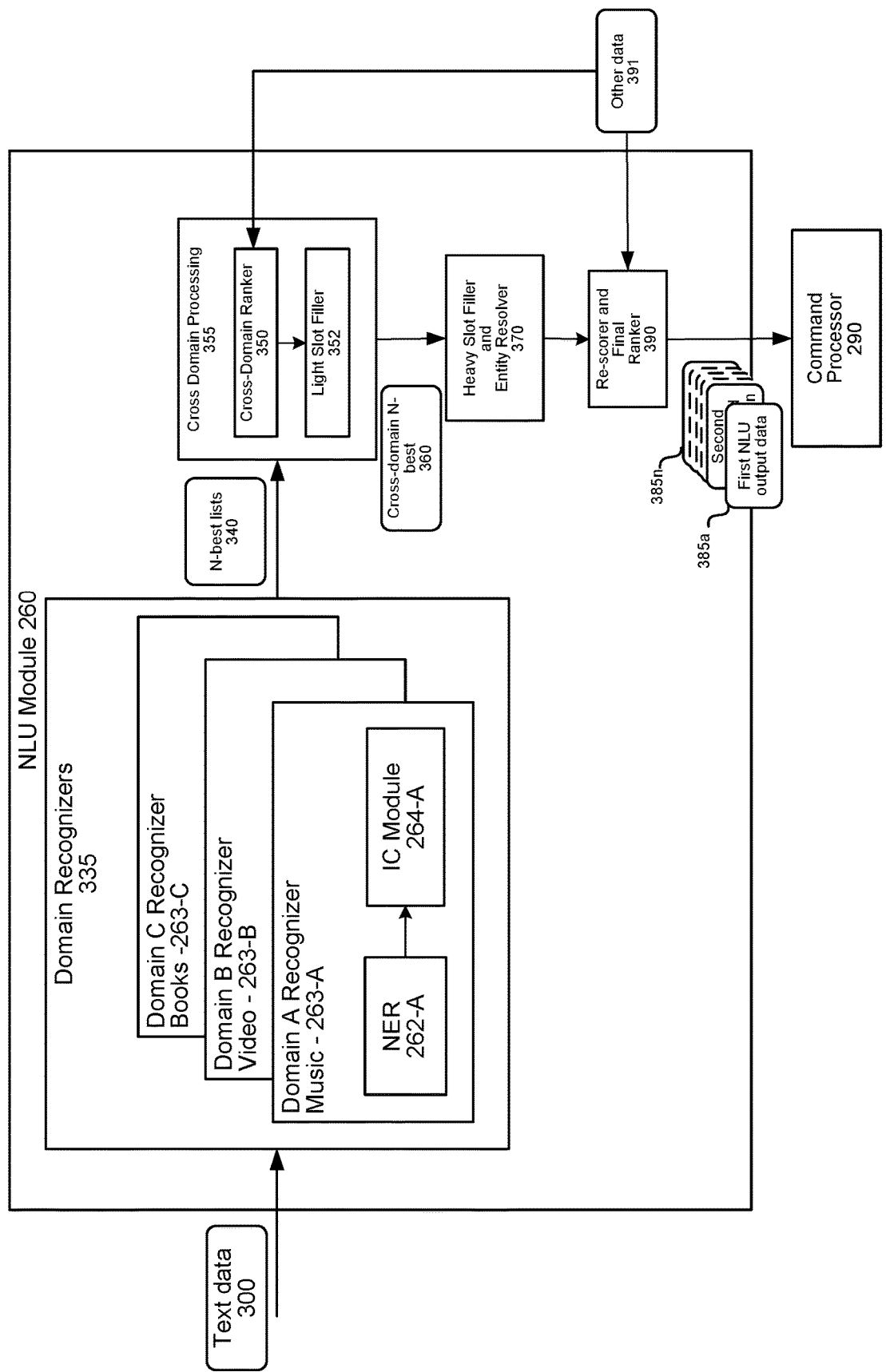
FIG. 3 is a conceptual diagram of a system architecture for parsing incoming utterances using multiple domains according to embodiments of the present disclosure.

The NLU operations of the system 100 may take the form of a multi-domain architecture, such as that illustrated in FIG. 3. In the illustrated architecture, each domain (which may include a set of intents and entity slots that define a larger concept such as music, books etc. as well as components such as trained models, etc. used to perform various NLU operations such as NER, IC, or the like) may be constructed separately and made available to the NLU component 260 during runtime operations where NLU operations are performed on text (such as text output from the ASR component 250). Each domain may have specially configured components to perform various steps of the NLU operations.

For example, the system 100 may include a multi-domain architecture consisting of multiple domains for intents/commands executable by the system 100 (or by other devices connected to the system 100), such as music, video, books, and information. The system 100 may include a plurality of domain recognizers 335, where each domain may include its own recognizer 263. Each recognizer may include various NLU components such as an NER component 262, IC module 264 and other components such as an entity resolver, or other components.

For example, a music domain recognizer 263-A (Domain A) may have an NER component 262-A that identifies what slots (i.e., portions of input text data 300) may correspond to particular words relevant to that domain. The words may correspond to entities such as (for the music domain) a performer, album name, song name, etc. An NER component 262 may use a machine learning model, such as a domain specific conditional random field (CRF) to both identify the portions corresponding to an entity as well as identify what type of entity corresponds to the text data portion. For example, for the text "play songs by the stones," an NER 262-A trained for a music domain may recognize the portion of text [the stones] corresponds to an entity and an artist name. The music domain recognizer 263-A may also have its own intent classification (IC) component 264-A that determines the intent of the text assuming that the text is within the proscribed domain. An IC component 264 may use a model, such as a domain specific maximum entropy classifier to identify the intent of the text, where the intent is the action the user desires the system 100 to perform.

As illustrated in FIG. 3, multiple domains may operate substantially in parallel, with different domain specific components. That is, domain B for video may have its own recognizer 263-B including NER component 262-B, and IC module 264-B. Domain C for books may also have similar components in its recognizer 263-C, and so on for the different domains available to the system. When input text data 300 (e.g., ASR output text data) is received, the same text data that is input into the NLU pipeline for domain A 263-A may also be input into the NLU pipeline for domain B 263-B, where the components for domain B 263-B will operate on the text data as if the text data related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC module 264 may be considered part of a recognizer (such as recognizer 263-A, 263-B, 263-C, etc.). The recognizers may operate using machine learning trained models such as a CRF, maximum entropy classifier, neural network (such as a deep neural network (DNN) or recurrent neural network (RNN)), or other classifier. The recognizers 335 may also use rules that operate on input query text data in a particular form to identify named entities and/or intents. The recognizers 335 may also operate using a data structure such as a finite state transducer (FST) to process the query text data to perform NER and/or IC. Other techniques or models may also be used to perform NER and/or IC. The techniques may also be used together. For example, a set of rules, an FST, and a trained machine learning model may all operate on input text data substantially in parallel to determine the named entities/intents of an input utterance. If one technique performs its task with high enough confidence, the system 100 may use the output of that technique over the others. The system 100 may also prioritize the results of different techniques in certain circumstances (for example rules results may be higher priority than FST results, which may be higher priority than model results, or some other configuration). Each recognizer (such as 263-A, 263-B, 263-C, etc.) may have its own rules, FSTs, and/or models operating such that each recognizer operates substantially in parallel to the other recognizers to come up with its own interpretation of the input text data.

The output of each recognizer 335 is a N-best list 340 of intents and identified slots representing the particular recognizer's top choices as to the meaning of the input text data, along with scores for each item in the N-best list 340. For example, for input text data 300 of "play poker face by lady gaga," the music domain recognizer 263-A may output an N-best list 340 in the form of:

[0.95] PlayMusicIntent ArtistName: Lady Gaga SongName: Poker Face

[0.02] PlayMusicIntent ArtistName: Lady Gaga

[0.01] PlayMusicIntent ArtistName: Lady Gaga AlbumName: Poker Face

[0.01] PlayMusicIntent SongName: Pokerface where the NER component 262-A of the recognizer 263-A has determined that for different items in the N-best list 340, the words "poker face" correspond to a slot and the words "lady gaga" correspond to a slot. (Though different items in the N-best list 340 interpret those slots differently, for example labeling "poker face" as a song name in one choice but labeling it as an album name in another.) The IC module 264-A of the recognizer 263-A has also determined that the intent of the input text data 300 is a PlayMusicIntent (and selected that as the intent for each item on the music N-best list 340). The recognizer 263-A also determined a score for each item on the list representing the recognizer's confidence that the particular item is correct. As can be seen in the example, the top item has the highest score. Each recognizer of the recognizers 335 may operate on the input text data 300 substantially in parallel, resulting in a number of different N-best lists 340, one for each domain (e.g., one N-best 340 list for music, one N-best list 340 for video, etc.). The size of any particular N-best list 340 output from a particular recognizer is configurable and may be different across domains.

While the recognizers 335 perform NER, that is they may identify words of the input text data 300 that are important for downstream processing (sometimes called light slot filling), and may even label those words according to type (such as artist name, album name, city, or the like), the recognizers 335 may not perform entity resolution (i.e., determining the actual entity corresponding to the words of the input text data 300). Entity resolution is typically a higher latency process and involves communications with a knowledge base 272 or other component to precisely identify the specific entities. As this process is resource intensive, it may be preferable to not perform this task for each item of every N-best list 340 across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 may be passed to a cross domain processing component 355 which may then further rank the individual items on the N-best lists 340 as well as perform other operations.

The cross domain processing component 355 may include a cross-domain ranker 350. The cross-domain ranker 350 takes the group of N-best lists 340 and selects from among the lists 340 the top choices to create a new N-best list 360 that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list 360 created by the cross-domain ranker 350, take the example input text data 300 of "play the hunger games." The text data 300 may be processed by each of the recognizers 335, and each will output an N-best list 340, resulting in a group of N-best lists 340 input into the cross domain processing component 355. The cross-domain ranker 350 may then rank the individual items among the N-best lists 340 to create a new N-best list 360. For example, the cross-domain ranker 350 may output an N-best list 360 in the form of:

[0.78] Video PlayVideoIntent VideoName: The Hunger Games
[0.13] Books ReadBookIntent BookName: The Hunger Games
[0.07] Music PlayMusicIntent AlbumName: Hunger Games where the top items from different N-best lists 340 from multiple domains are grouped into a single N-best list 360. As shown, the top scoring item is from the video domain 263-B, which includes the intent "playvideointent" and a slot labeled as video name corresponding to the text "the hunger games." The next item is from the books domain 263-C, and includes the intent "readbookintent" and a slot labeled as book name corresponding to the text "the hunger games." Each item in the N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. The light slot filler 352 can take information from slots and alter it to make the data more easily processed by downstream components The operations of the light slot filler 352 are typically low latency operations that do not involve heavy operations such as reference to a knowledge base. The purpose of the light slot filler 352 is to replace words with other words or values that may be more easily understood by downstream components. For example, if input text data 300 included the word "tomorrow", the light slot filler 352 may replace the word "tomorrow" with an actual date for purposes of downstream processing. Similarly, a word "CD" may be replaced by a word "album." The replaced words are then included in the cross domain N-best list 360.

The N-best list 360 is then output to a heavy slot filler and entity resolution component 370. The heavy slot filler and entity resolver 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user query). For example, in the example "play songs by the stones," the resolver 370 may reference to a personal music catalog, Amazon Music account, user profile (discussed in detail below), or the like. The output from the entity resolution component 370 may include an altered N-best list that is based on the cross-domain N-best list 360 but also includes more detailed information about the specific entities mentioned in the text data 300 (such as specific entity IDs) and/or more detailed slot data that can eventually be used by a command processor 290 which may be incorporated into the same system components or pipeline or may be on a separate device in communication with the system 100. While illustrated as a cross-domain resolver, multiple resolution components 370 may exist where a particular resolution component 370 may be specific for one or more domains.

As can be appreciated, the entity resolver 370 may not necessarily be successful in resolving every entity and filling every slot. This may result in incomplete results in the combined N-best list 360. A re-scorer and final ranker component 390 may consider such errors when determining how to rank the ultimate results for potential execution. For example, if an item of the N-best list 360 comes from a book domain and includes a read book intent, but the entity resolver 370 cannot find a book with a title matching the input text data 300, that particular result may be re-scored by the final ranker 390 to be given a lower score. Each item considered by the final ranker 390 may also be assigned a particular confidence, where the confidence may be determined by a recognizer 335, cross domain processor 355, or by the final ranker 390 itself. Those confidence scores may be used to determine how to rank the individual NLU results represented in the N-best lists 340. The confidence scores may be affected by unfilled slots. For example, if one domain is capable of filling a slot (i.e., resolving the word in the slot to an entity or other recognizable form) for an input query, the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists 340, but may also consider other data 391. This other data 391 may include a variety of information. For example, the other data 391 may include application rating or popularity. For example, if one application has a particularly high rating, the system 100 may increase the score of results associated with that particular application. The other data 391 may also include information about applications that have been specifically enabled by the user (as indicated in a user profile as discussed in detail below). NLU results from enabled applications may be scored higher than results from non-enabled applications. User history may also be considered, such as if the user regularly uses a particular supplemental application or does so at particular times of day. Date, time, location, weather, type of device 110, customer ID, context, and other information may also be considered. For example, the system 100 may consider when any particular applications are currently active (such as music being played, a game being played, etc.) between the system 100 and device 110. The highest scoring result (or results in the case of multiple commands being in an utterance) may be passed to a downstream command processor 290 for execution.

Following final ranking, the NLU module 260 may output NLU output data 385. The NLU output data 385 may include an indicator of the command to be executed along with data associated with the command, for example an indication that the command is "play music" and the music to be played is "Adele." The NLU output data 385 may be in the form of previous NLU data such as item(s) in N-best list 340, item(s) in cross-domain N-best list 360, or the like. The NLU output data 385 may also be in a format executable by the command processor 290. Multiple instances of NLU output data (e.g., 385a-385n) may be output.

Figure 4:
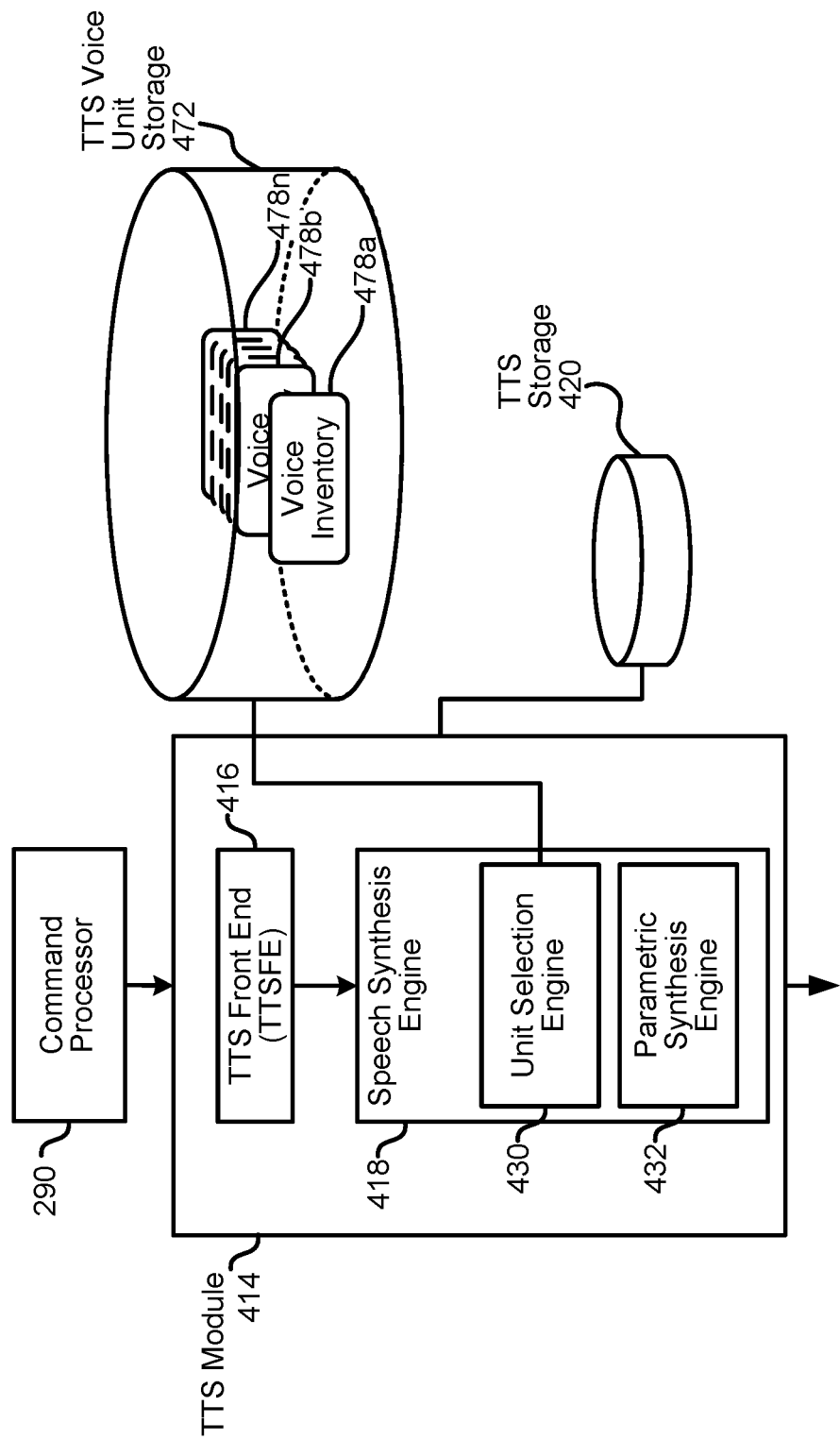
FIG. 4 is a conceptual diagram of how text-to-speech processing is performed according to embodiments of the present disclosure.

A TTS module 414 may receive tagged text data from the command processor 290, so the TTS module 414 may synthesize speech corresponding to the text data. Speech may be synthesized by the TTS module 414 as described below with respect to FIG. 4.

The TTS module 414 includes a TTS front end (TTSFE) 416, a speech synthesis engine 418, and a TTS storage 420. The TTSFE 416 transforms input text data (e.g., from the command processor 290) into a symbolic linguistic representation for processing by the speech synthesis engine 418. The TTSFE 416 may also process tags or other data input to the TTS module 414 that indicate how specific words should be pronounced. The speech synthesis engine 418 compares the annotated phonetic units and information stored in the TTS storage 420 for converting the input text data into speech (i.e., audio data). The TTSFE 416 and the speech synthesis engine 418 may include their own controller(s)/processor(s) and memory, or they may use the controller/processor and memory of the server 120, the speech-controlled device 110, or another device, for example. Similarly, the instructions for operating the TTSFE 416 and the speech synthesis engine 418 may be located within the TTS module 414, within the memory and/or storage of the server 120, the speech-controlled device 110, or within an external device.

Text data input into the TTS module 414 may be sent to the TTSFE 416 for processing. The TTSFE 416 may include modules for performing text normalization, linguistic analysis, and linguistic prosody generation. During text normalization, the TTSFE 416 processes the input text data and generates standard/normalized text data, converting such things as numbers, abbreviations (e.g., Apt., St., etc.), and symbols ($, %, etc.) into the equivalent of written out words.

During linguistic analysis, the TTSFE 416 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS module 414 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 420. The linguistic analysis performed by the TTSFE 416 may also identify different grammatical components such as prefixes, suffixes, phrases, punctuation, syntactic boundaries, or the like. Such grammatical components may be used by the TTS module 414 to craft a natural sounding audio waveform output. The language dictionary may also include letter-to-sound rules and other tools that may be used to pronounce previously unidentified words or letter combinations that may be encountered by the TTS module 414. Generally, the more information included in the language dictionary, the higher quality the speech output.

Based on the linguistic analysis, the TTSFE 416 may then perform linguistic prosody generation where the phonetic units are annotated with desired prosodic characteristics, also called acoustic features, which indicate how the desired phonetic units are to be pronounced in the eventual output speech. During this stage, the TTSFE 416 may consider and incorporate any prosodic annotations that accompanied the text data input to the TTS module 414. Such acoustic features may include pitch, energy, duration, and the like. Application of acoustic features may be based on prosodic models available to the TTS module 414. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 416, referred to as a symbolic linguistic representation, may include a sequence of phonetic units annotated with prosodic characteristics. This symbolic linguistic representation may be sent to the speech synthesis engine 418, also known as a synthesizer, for conversion into an audio waveform of speech for output to an audio output device and eventually to a user. The speech synthesis engine 418 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 418 may perform speech synthesis using one or more different methods. In one method of synthesis called unit selection, a unit selection engine 430 matches the symbolic linguistic representation created by the TTSFE 416 against a database of recorded speech, such as a database of a voice corpus (e.g., the TTS voice unit storage 472). The unit selection engine 430 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 430 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 432, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS module 414 may include an acoustic model, or other models, which may convert a symbolic linguistic representation into a synthetic acoustic waveform of the input text data based on audio signal manipulation. The acoustic model includes rules which may be used by the parametric synthesis engine 432 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 416.

The parametric synthesis engine 432 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 418, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 478 (stored in the TTS voice unit storage 472), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio data of each customized voice corpus may match a desired speech quality. The customized voice inventory 478 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS module 414 may synthesize speech as normal, but the system 100, either as part of the TTS module 414 or otherwise, may apply a filter to make the synthesized speech take on the desired speech quality. In this manner a traditional TTS output may be altered to take on the desired speech quality.

During runtime the TTS module 414 may receive text data for speech synthesis along with an indicator for a desired speech quality of the output speech. The TTS module 414 may then select a voice matching the speech quality, either for unit selection or parametric synthesis, and synthesize speech using the received text data and speech quality indicator.

Figure 5:
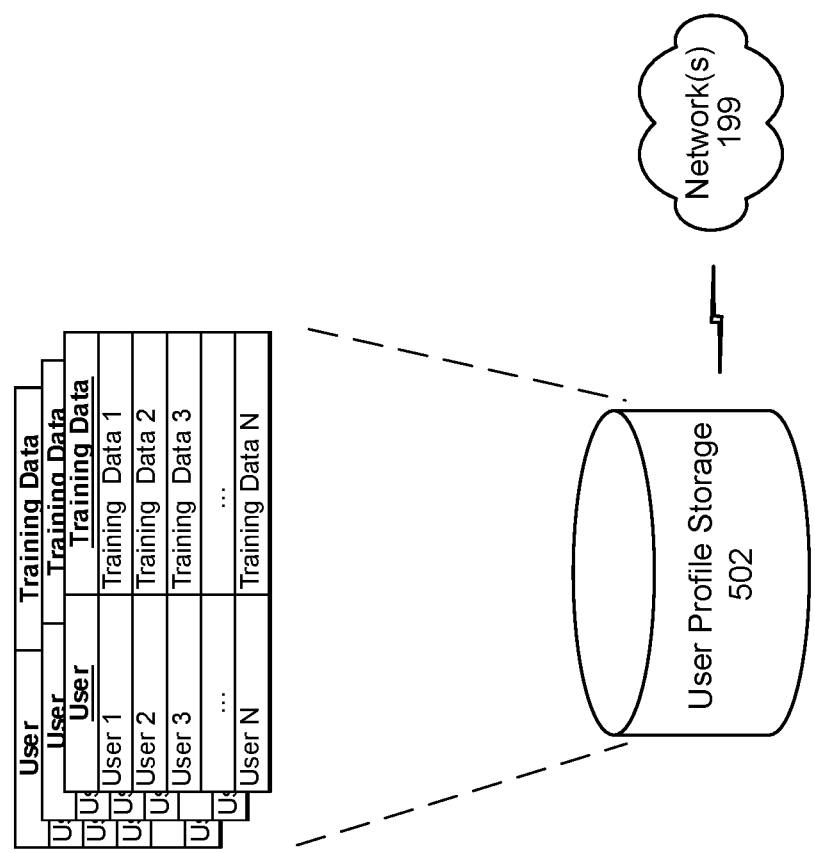
FIG. 5 illustrates data stored and associated with user profiles according to embodiments of the present disclosure.

FIG. 5 illustrates a user profile storage 502 that includes data regarding users of a device. The user profile storage 502 may be located proximate to the server(s) 120, or may otherwise be in communication with various components of the system 100, for example over the network 199. The user profile storage 502 may include a variety of information related to individual users, accounts, etc. that interact with the system 100. In an example, the user profile storage 502 is a cloud-based storage. For illustration, as shown in FIG. 5, the user profile storage 502 may include data regarding multiple users of a single speech-controlled device 110 (or other device). Each user indicated in a user profile associated with a speech-controlled device 110 may be associated with training data corresponding to training spoken utterances of the respective user, such as training data 805 discussed below. In addition or alternatively, each user indicated in the user profile associated with a speech-controlled device 110 may be associated with feature/vector data corresponding to training data of the respective user. Further, each user may have a user ID that identifies the specific user for further system processing.

Figure 6:
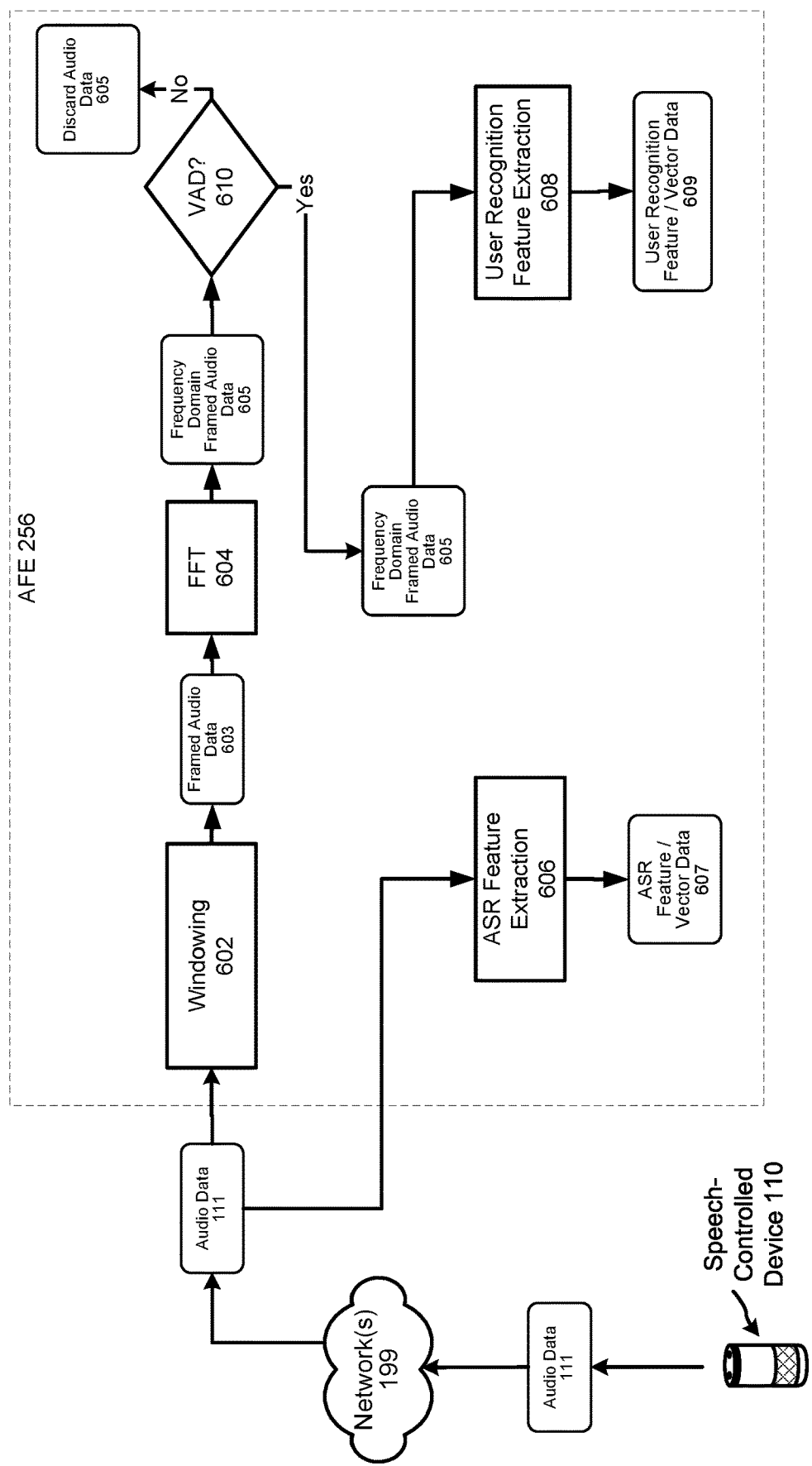
FIG. 6 is a flow diagram illustrating processing performed to prepare audio data for ASR and user recognition according to embodiments of the present disclosure.

FIG. 6 illustrates processing performed to prepare audio data for ASR and user recognition. The speech-controlled device 110 sends audio data 111 through a network(s) 199 to the server(s) 120 for processing. The server(s) 120 may include an acoustic front end (AFE) 256 (or other component(s)) that performs various functions on the incoming audio data 111 to prepare the incoming audio data 111 for further downstream processing, such as ASR and/or user recognition. For example, the AFE 256 may perform (602) windowing functions on the audio data 111 to create framed audio data 603 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 256 may then perform (604) a fast Fourier transform (FFT) that converts the waveforms in each frame of the framed audio data 603 from its original domain (e.g., time) to a representation in a frequency domain (thereby creating frequency domain framed audio data 605). Audio processing techniques other than or in addition to FFT may be used to transform audio data (e.g., waveforms) into data that can be processed as needed.

The server(s) 120 (through the AFE 256 or using another component) then detects (610) whether voice activity (i.e., speech) is present in the post-FFT waveforms (i.e., frequency domain framed audio data 605). In doing so the server(s) 120 may perform VAD operations discussed above. The VAD detector 610 (or other components) may also be configured in a different order, for example the VAD detector 610 may operate on input audio data 111 rather than on frequency domain framed audio data 605, may operate on ASR features, etc. Various different configurations of components are possible. If there is no speech in the audio data, the server(s) 120 discards the frequency domain framed audio data 605 (i.e., removes the audio data from the processing stream). If, instead, the server(s) 120 detects speech in the frequency domain framed audio data 605, the server(s) 120, performs user recognition feature extraction (608) on the frequency domain framed audio data 605. User recognition feature extraction (608) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature/vector data 609). The feature extraction may continue until voice activity is no longer detected in the input audio data, at which point the server(s) 120 may determine that an endpoint of the speech has been reached processing with respect thereto. ASR feature extraction (606) may be performed on all the audio data 111 received from the speech-controlled device 110. Alternatively (not illustrated), ASR feature extraction (606) may only be performed on audio data including speech (as indicated by the VAD 610). ASR feature extraction (606) and user recognition feature extraction (608) involve determining values (i.e., features) representing qualities of the frequency domain framed audio data 605, along with quantitating those features into values (i.e., feature vectors or audio feature vectors). ASR feature extraction (606) may determine ASR feature/vector data 607 useful for ASR processing, and user recognition feature extraction (608) may determine user recognition feature/vector data 609 useful for user recognition. The ASR feature/vector data 607 and the user recognition feature/vector data 609 may be the same features/vectors, different features/vectors, or may include some overlapping features/vectors. A number of approaches may be used to extract features/vectors from the frequency domain framed audio data 605, such as MFCCs, PLP techniques, neural network feature vector techniques, linear discriminant analysis, semi-tied covariance matrices, or other approaches known to those skilled in the art.

Typically, the ASR feature/vector data 607 may include a different audio feature vector for each audio frame. Thus, for one 25 ms long audio frame, the ASR feature extraction component 606 may output a single ASR feature vector. The ASR feature vectors 607 output by the ASR feature extraction component 606 may be output to an ASR module 250 to perform speech recognition.

Depending on system configuration, the user recognition feature extraction component 608 may output multiple user recognition feature vectors, for example one such vector for each audio frame. Alternatively, the user recognition feature extraction component 608 may continue to input the frequency domain framed audio data 605 while the utterance is ongoing (e.g., before the endpoint of the speech is reached in the audio data 605). While the audio data 605 for the utterance is input, the user recognition feature extraction component 608 may accumulate or otherwise combine the audio data 605 as it comes in. That is, for a certain frame's worth of audio data 605 that comes in, the user recognition feature extraction component 608 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 608 may depend on what audio qualities are determined to be important for ultimate user recognition. Thus, the user recognition feature extraction component 608 may be trained to isolate and process data that is most useful for user recognition. The output of the user recognition feature extraction component 608 may thus include user recognition feature/vector data 609 that includes values for features useful for user recognition. The resulting user recognition feature/vector data 609 may then be used for user recognition.

Figure 7:
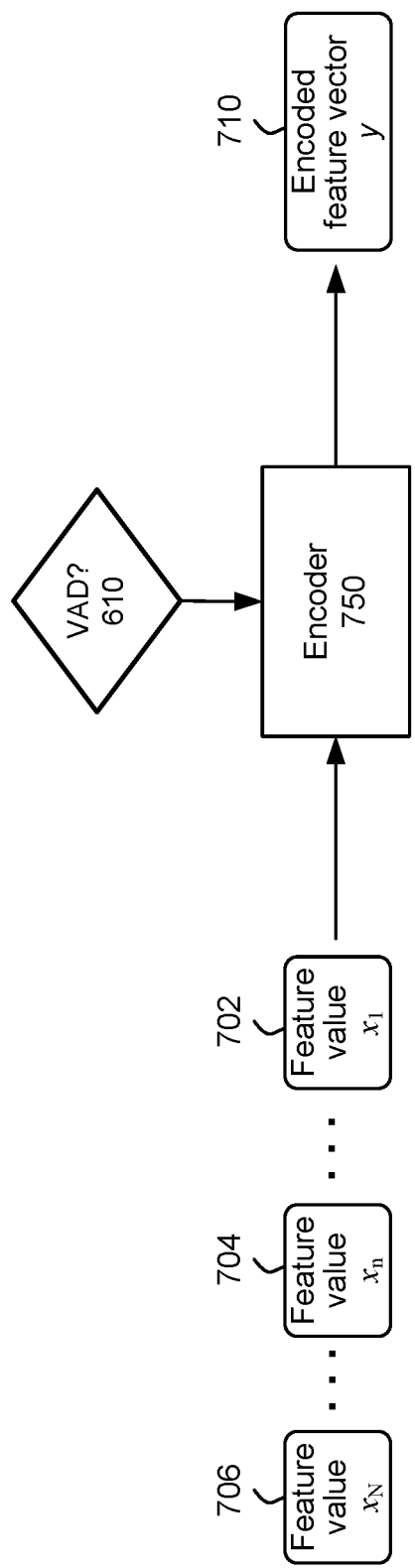
FIG. 7 is a diagram of a vector encoder according to embodiments of the present disclosure.

The user recognition feature/vector data 609 may include multiple vectors each corresponding to different portions of the input utterance. Alternatively, the user recognition feature/vector data 609 may be a single vector representing audio qualities of the input utterance. Referring to FIG. 7, the single vector may be created using an encoder 750 which can create a fixed-size vector to represent certain characteristics of the audio data entities as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As shown in FIG. 7, feature values 702 through 706 (which may include feature vectors of audio data 111, frequency domain framed audio data 605, or the like) may be input into an encoder 750 which will output an encoded feature vector 710 that represents the input feature values. The VAD 610 may be an input into the encoder 750 such that the encoder 750 may only operate when feature values input therein correspond to speech. The individual feature values (e.g., 702-706) may correspond to specific audio frames. Regardless of how many feature values are input, any particular encoder 750 will be configured to output vectors of the same size, thus ensuring a continuity of output encoded vector size from any particular encoder 750 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a neural network (NN), recurrent neural network (RNN), GMM, or other model. One particular example is a long short-term memory (LSTM) RNN. There are a variety of ways for the encoder 750 to consume the encoder input, including but not limited to:

linear, one direction (forward or backward),
bi-linear, essentially the concatenation of a forward and a backward embedding, or
tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 7 illustrates operation of the encoder 750. The input feature value sequence, starting with feature value $x_1$ 702, continuing through feature value $x_n$ 704 and concluding with feature value $x_N$ 706 is input into the encoder 750. The encoder 750 may process the input feature values as noted above. The encoder 750 outputs the encoded feature vectory 710, which is a fixed length feature vector of length F. Thus, the user recognition feature extraction component 608 may include an encoder 750 that receives audio feature values for a particular utterance as input, and outputs a fixed length encoded feature vectory 710, which may be the user recognition feature/vector data 609. Thus, in certain system configurations, no matter how long the utterance is, or how many acoustic frames worth of feature values are input into the encoder 750, the output feature vector 710/609 will be of the same length, thus allowing for more ease of performing user recognition by the user recognition module 802. To allow for robust system operation a final vector 609 may include many dimensions (e.g., several hundred), thus providing many data points for downstream consideration.

To determine the user recognition feature/vector data 609, the system may (for example using VAD detector 610) determine that voice activity is detected in input audio. This may indicate the beginning of the utterance, thus resulting in the system determining that the input utterance starts at a first point in audio data. Audio processing (for example by windowing 602, FFT 604, ASR feature extraction 606, user recognition feature extraction 608, ASR module 250, or the like) may continue on the utterance audio data starting at the first point and continuing until the VAD detector 610 determines that voice activity is no detected at a second point in audio data. Thus, the system may determine that the input utterance ends at the second point. Thus, the first point may be considered the beginpoint of the utterance and the second point may be considered the endpoint of the utterance. The VAD detector 610, or other component, may signal the user recognition feature extraction component 608 when the beginpoint and/or endpoint is detected so that the user recognition feature extraction component 608 may begin processing audio data starting at the beginpoint and ending at the endpoint. Further, audio frames during the utterance that do not include speech may be filtered out by the VAD detector 610 and thus not considered by the ASR feature extraction 606 and/or user recognition feature extraction 608. The resulting accumulated/processed speech audio data for the utterance (from beginpoint to endpoint) may then be represented in a single feature vector for the user verification feature/vector data 609, which may then be used for user recognition.

Figure 8:
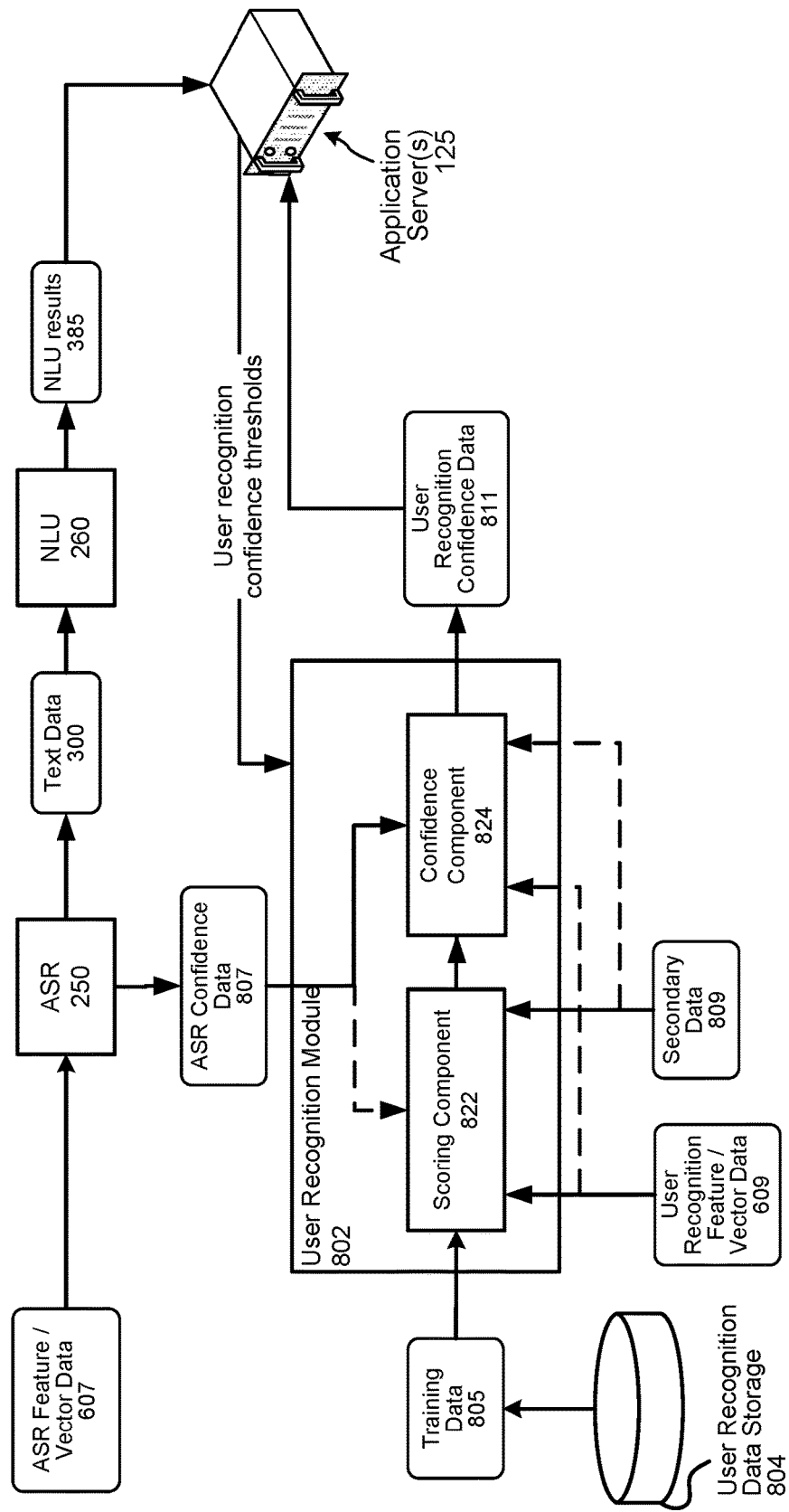
FIG. 8 is a system flow diagram illustrating user recognition according to embodiments of the present disclosure.

FIG. 8 illustrates user verification as performed by the server(s) 120. The ASR module 250 performs ASR on the ASR feature/vector data 607 as described above. ASR output (i.e., text data 300) is then processed by the NLU module 260 as described above. The ASR confidence data 807 may then be passed to a user recognition module 802.

The user recognition module 802 of the server(s) 120 performs user recognition using various data including the user recognition feature/vector data 609 and training data 805 which may correspond to sample audio data corresponding to known users, the ASR confidence data 807 and secondary data 809. The user recognition module 802 may then output user recognition confidence data 811 which reflects a certain confidence that the input utterance was spoken by one or more particular users. The user recognition confidence data 811 may not indicate access privileges of the user(s). The user recognition confidence data 811 may include an indicator of the verified user (such as a user ID corresponding to the speaker of the utterance) along with a confidence value corresponding to the user ID, such as a numeric value or binned value as discussed below.

The training data 805 may be stored in a user recognition data storage 804. The user recognition data storage 804 may be stored by the server(s) 120, or may be a separate device. Further, the user recognition data storage 804 may be part of user profile storage 502. The user recognition data storage 804 may be a cloud-based storage. The training data 805 stored in the user recognition data storage 804 may be stored as waveforms and/or corresponding features/vectors. The training data 805 may correspond to data from various audio samples, each audio sample associated with a known user and/or user identity. For example, each user known to the system may be associated with some set of training data 805 for the known user. The user recognition module 802 may then use the training data 805 to compare against incoming audio data (represented by user recognition feature/vector data 609) to determine the identity of a user speaking an utterance. The training data 805 stored in the user recognition data storage 804 may thus be associated with multiple users of multiple devices. Thus, the training data 805 stored in the storage 804 may be associated with both a user that spoke the respective utterance, as well as the speech-controlled device 110 that captured the respective utterance.

The training data 805 for a particular user may include a feature vector of the same size as a vector of the user recognition feature/vector data 609. Thus, for example, if a feature vector 609 is of size F (for example encoded by encoder 750), the training data 805 may also be a feature vector of size F. To create such a training data feature vector, during a training period the system may either prompt a user to speak sample audio data or may identify sample audio data known to have been spoken by a particular user. The system may then process the sample audio data (for example into feature values such as 702-706 and then by encoder 750) to create sample training data 805 (e.g., a feature vector of size F). The training data 805 may then be stored by the system (such as in data storage 804) and saved for use during runtime user verification processing.

To perform user recognition, the user recognition module 802 may determine the speech-controlled device 110 from which the audio data 111 originated. For example, the audio data 111 may include a tag indicating the speech-controlled device 110. Either the speech-controlled device 110 or the server(s) 120 may tag the audio data 111 as such. The tag indicating the speech-controlled device 110 may be associated with the user recognition feature/vector data 609 produced from the audio data 111. The user recognition module 802 may send a signal to the user recognition data storage 804, with the signal requesting only training data 805 associated with known users of the speech-controlled device 110 from which the audio data 111 originated. This may include accessing a user profile associated with the speech-controlled device 110 and then only inputting training data 805 associated with users corresponding to the user profile of the device 110. This limits the universe of possible training data the recognition module 802 should consider at runtime when verifying a user and thus decreases the amount of time to perform user recognition by decreasing the amount of training data 805 needed to be processed. Alternatively, the user recognition module 802 may access all (or some other subset of) training data 805 available to the system. However, accessing all training data 805 will likely increase the amount of time needed to perform user recognition based on the magnitude of training data to be processed.

If the user recognition module 802 receives training data 805 as an audio waveform, the user recognition module 802 may determine features/vectors of the waveform(s) or otherwise convert the waveform into a data format that can be used by the user recognition module 802 to actually perform the user recognition. The user recognition module 802 may then recognize the user that spoke the utterance in the audio data 111 by comparing features/vectors of the user recognition feature/vector data 609 to training features/vectors (either received from the storage 804 or determined from training data 805 received from the storage 804).

The user recognition module 802 may include a scoring component 822 which determines respective scores indicating whether the input utterance (represented by user recognition feature/vector data 609) was spoken by particular users (represented by training data 805). The user recognition module 802 may also include a confidence component 824 which determines an overall confidence as the accuracy of the user recognition operations (such as those of the scoring component 822) and/or an individual confidence for each user potentially identified by the scoring component 822. The output from the scoring component 822 may include scores for all users with respect to which user recognition was performed (e.g., all users associated with the speech-controlled device 110). For example, the output may include a first score for a first user, a second score for a second user, and third score for a third user, etc. Although illustrated as two separate components, the scoring component 822 and confidence component 824 may be combined into a single component or may be separated into more than two components.

The scoring component 822 and confidence component 824 may implement one or more trained machine learning models (such neural networks, classifiers, etc.) as known in the art. For example, the scoring component 822 may use probabilistic linear discriminant analysis (PLDA) techniques. PLDA scoring determines how likely it is that the input user recognition feature vector 609 corresponds to a particular training data feature vector 805 for a particular user. The PLDA scoring may generate similarity scores for each training feature vector considered and may output the list of scores and users and/or the user ID of the speaker whose training data feature vector most closely corresponds to the input user recognition feature vector 609 of the utterance. The scoring component 822 may also use other techniques such as GMMs, generative Bayesian models, or the like, to determine similarity scores.

The confidence component 824 may input various data including information about the ASR confidence 807, utterance length (e.g., number of frames or time of the utterance), audio condition/quality data (such as signal-to-interference data or other metric data), fingerprint data, image data, or other factors to consider how confident the user recognition module 802 is with regard to the scores linking users to the input utterance. The confidence component 824 may also consider the similarity scores and user IDs output by the scoring component 822. Thus, the confidence component 824 may determine that a lower ASR confidence 807, or poor input audio quality, or other factors, may result in a lower confidence of the user recognition module 802. Whereas a higher ASR confidence 807, or better input audio quality, or other factors, may result in a higher confidence of the user recognition module 802. Precise determination of the confidence may depend on configuration and training of the confidence component 824 and the models used therein. The confidence component 824 may operate using a number of different machine learning models/techniques such as GMM, neural networks, etc. For example, the confidence component 824 may be a classifier configured to map a score output by the scoring component 822 to a confidence.

The user recognition module 802 may output user recognition confidence data 811 specific to a single user. The user recognition confidence data 811 may include a particular score (e.g., 0.0-1.0, 0-1000, or whatever scale the system is configured to operate). Alternatively or in addition, the user recognition confidence data 811 may include a binned recognition indicator. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Combined binned and confidence score outputs are also possible. The user recognition module 802 may also output a confidence value that the score/bin is correct, where the confidence value indicates how confident the user recognition module 802 is in the output results. This confidence value may be determined by the confidence component 824.

The confidence component 824 may determine individual user confidences and differences between user confidences when determining the user recognition confidence data 811. For example, if a difference between a first user's confidence score and a second user's confidence score is large, and the first user's confidence score is above a threshold, then the user recognition module 802 is able to recognize the first user as the user that spoke the utterance with a much higher confidence than if the difference between the users' confidences were smaller.

The user recognition module 802 may perform certain thresholding to avoid incorrect user recognition results being output. For example, the user recognition module 802 may compare a confidence score output by the confidence component 824 to a confidence threshold. If the confidence score is not above the confidence threshold (for example, a confidence of "medium" or higher), the user recognition module 802 may not output user recognition confidence data 811, or may only include in that data 811 an indication that a user speaking the utterance could not be verified. Further, the user recognition module 802 may not output user recognition confidence data 811 until enough user recognition feature/vector data 609 is accumulated and processed to recognize the user above a threshold confidence. Thus the user recognition module 802 may wait until a sufficient threshold quantity of audio data of the utterance has been processed before outputting user recognition confidence data 811. The quantity of received audio data may also be considered by the confidence component 824.

The user recognition module 802 may be defaulted to output binned (e.g., low, medium, high) user recognition confidence data 811. However, such may be problematic from the application server(s) 125 perspective. For example, if the user recognition module 802 computes a single binned confidence for multiple users, the application server(s) 125 may not be able to determine which user to determine content with respect to. In this situation, the user recognition module 802 may be configured to override its default setting and output user recognition confidence data 811 including numeric values (e.g., 0.0-1.0) associated with the users associated with the same binned confidence. This enables the application server(s) 125 to select content associated with the user associated with the highest confidence value. The user recognition confidence data 811 may also include the user IDs corresponding to the potential user(s) who spoke the utterance.

The NLU results 385 may invoke multiple application servers 125 having access to content responsive to a spoken utterance. The server(s) 120 may communicate with one or more of the application servers 125 without having to use a network(s) 199. Alternatively, the server(s) 120 may communicate with one or more of the application servers 125 through a network(s) 199.

Each application server 125 may have a respective user recognition confidence threshold that must be satisfied prior to the application server 125 providing content responsive to the spoken utterance in the audio data 111. The application server(s) 125 may individually send a request for user recognition data to the user recognition module 802. Each request may include the user recognition confidence threshold of the application server 125 from which the request originated/was sent. Alternatively, a component of the server(s) 120 may compile the user recognition confidence thresholds of all the application servers 125 invoked by a spoken utterance, and may send all the user recognition confidence thresholds to the user recognition module 802 in a single transmission. The user recognition confidence thresholds may be in the form of numeric confidence values (e.g., 0.0-1.0, 0-1000) or confidence indicators (e.g., low, medium, high). All of the user recognition confidence thresholds sent to the user recognition module 802 may be confidence values, all of the user recognition confidence thresholds sent to the user recognition module 802 may be in the form of confidence indicators, or some of the user recognition confidence thresholds sent to the user recognition module 802 may be in the form of confidence values while others are in the form of confidence indicators.

The user recognition module 802 may determine user recognition confidence data 811 with respect to all of the users indicated in the profile associated with the speech-controlled device 110. The user recognition module 802 may then determine whether one or more users are associated with user recognition confidence data 811 satisfying a most stringent (e.g., highest) received user recognition confidence threshold. If the user recognition module 802 determines a single user is associated with user recognition confidence data 811 that meets or exceeds the highest user recognition confidence threshold, the user recognition module 802 sends the user recognition confidence data 811 to the application servers 125 from which the user recognition confidence thresholds were received.

If the user recognition module 802 does not determine a user associated with user recognition confidence data 811 that meets or exceeds the highest user recognition confidence threshold, the user recognition module 802 may cause speech-controlled device 110 (and/or a different devices indicated in profiles associated with the users indicated in the speech-controlled device's profile) to gather additional data usable for user recognition. Such additional data may include image data or video data that may be used for facial recognition, for example. Such additional data may also include biometric data such as retina image data captured using a retina scanner and used for retina verification. Moreover, such additional data may include biometric data such as fingerprint data captured using a fingerprint scanner and used for fingerprint verification. Other user identifying data may also be used. The user recognition module 802 may perform user recognition using additional data until the user recognition module 802 determines a single user (indicated in the profile associated with the speech-controlled device 110) associated with user recognition confidence data 811 that meets or exceeds the highest user recognition confidence threshold. Likewise, if the user recognition module 802 determines more than one user associated with user recognition confidence data 811 that meets or exceeds the highest user recognition confidence threshold, the user recognition module 802 uses additional data (described above) to perform user recognition until only a single user is associated with user recognition confidence data 811 that meets or exceeds the highest user recognition confidence threshold.

In addition, the user recognition module 802 may use secondary data 809 to inform user recognition processing. Thus, a trained model or other component of the user recognition module 802 may be trained to take secondary data 809 as an input feature when performing recognition. Secondary data 809 may include a wide variety of data types depending on system configuration and may be made available from other sensors, devices, or storage such as user profile data 502, etc. The secondary data 809 may include a time of day at which the audio data was captured, a day of a week in which the audio data was captured, the text data 300, and/or the NLU results 385.

The server(s) 120 may receive the secondary data 809 from various devices local to the user (e.g., the speech-controlled device 110a, a smart phone, a biometric sensor, etc.). The secondary data 809 received may depend upon the situation of the user's environment. For example, if multiple individuals are located proximate to the devices(s) (e.g., as determined by multiple individuals being located within a field of view of the camera 115 or based on multiple individuals' voices being detected in audio data captured by the microphone 103), the server(s) 120 may receive secondary data 809 corresponding to a passcode, biometric content, or other content that may not be overheard/overseen by the other individuals. The passcode may be provided via a touch interface of a smart device (such as a smart phone, tablet, etc.). The biometric content may be a fingerprint captured by a fingerprint scanner, an image(s) of a retina captured by a retina scanner, etc. In another example, if multiple individuals are located around the user, the secondary data 809 may only be a portion of a passcode. A user profile may indicate an alphanumeric passcode and the server(s) 120 (or another device) may solicit only a portion (e.g., the third digit) of the passcode from the user. These techniques may be beneficial if it is determined that multiple individuals are present because it allows the user to provide useful verification data without having the user divulge confidential information to unauthorized individuals.

Each form of secondary data 809 (e.g., image data for retina verification, passcode data, etc.) may be associated with a respective score/weight, or generally the determined confidence data 811 may depend on the available forms of secondary data and their respective scores, if any. For example, a user recognition performed using retina scan data may increase a confidence data, but the amount of increase may depend on a score associated with the retina scan data (e.g., a score from a retina scan component that produces retina scan data). Thus, it should be appreciated that different forms of secondary data 809 may affect user recognition determinations differently.

A profile associated with each user may include reference secondary data (i.e., reference retina image data, reference fingerprint image data, etc.) to which captured secondary data 809 is compared for purposes of user recognition. Moreover, each user profile may include reliability weight information associated with each type of secondary data 809. The reliability weight information may be specific to the device configured to capture the secondary data. For example, if the user has two different retina scanners, a first retina scanner may have be associated with a first reliability weight and a second retina scanner may be associated with a second reliability weight. If the user recognition module 802 determines initial user recognition confidence data 811 that does not satisfy the most stringent user recognition confidence threshold, the user recognition module 802 may cause secondary data 809 to be captured thereafter, and may use the secondary data 809 to determine updated user recognition confidence data 811.

In one example, secondary data 809 may include image data or video data. For example, facial recognition may be performed on image data or video data received from the speech-controlled device 110 from which the audio data 111 was received. Facial recognition may be performed by the user recognition module 802, or another component of the server(s) 120. The output of the facial recognition process may be used by the user recognition module 802. That is, facial recognition output data may be used in conjunction with the comparison of the features/vectors of the audio data 111 and training data 805 to perform more accurate user recognition. Thus, while training data 805 may be based on speech samples of a user, the training data 805 may also be based on other data such as image data corresponding to known pictures of the user, retina scan data corresponding to the user, fingerprint data, etc.

The secondary data 809 may also include location data of the speech-controlled device 110. The location data may be specific to a building within which the speech-controlled device 110 is located. For example, if the speech-controlled device 110 is located in user A's bedroom, such location may increase user recognition confidence data associated with user A, but decrease user recognition confidence data associated with user B.

The secondary data 809 may further include type data indicating a type of the speech-controlled device 110. Different types of speech-controlled devices may include, for example, a smart watch, a smart phone, a tablet computer, and a vehicle. The type of the speech-controlled device 110 may be indicated in a profile associated with the speech-controlled device 110. For example, if the speech-controlled device 110 from which the audio data 111 was received is a smart watch or vehicle belonging to user A, the fact that the speech-controlled device 110 belongs to user A may increase user recognition confidence data associated with user A, but decrease user recognition confidence data associated with user B.

The secondary data 809 may additionally include geographic coordinate data associated with the speech-controlled device 110. For example, a profile associated with a vehicle may indicate multiple users (e.g., user A and user B). The vehicle may include a global positioning system (GPS) indicating latitude and longitude coordinates of the vehicle when the audio data 111 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the speech-controlled device 110. The global coordinates and associated locations may be associated with respective users in the user profile.

The secondary data 809 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 809 and considered by the user recognition module 802. If a mobile device (such as a phone, Tile, dongle, or other device) known to be associated with a particular user is detected proximate to (for example physically close to, connected to the same WiFi network as, or otherwise nearby) the speech-controlled device 110, this may be reflected in the secondary data 809 and considered by the user recognition module 802.

Depending on system configuration, the secondary data 809 may be configured to be included in the vector representation of the user recognition feature/vector data 609 (for example using encoder 750) so that all the data relating to the utterance to be processed by the scoring component 822 may be included in a single vector. Alternatively, the secondary data 809 may be reflected in one or more different data structures to be processed by the scoring component 822.

As shown in FIG. 8, the ASR module 250 may output text data 300, which in turn is processed by the NLU component 260. The results 385 of NLU processing performed by the NLU module 260 and the user recognition confidence data 811 output by the user recognition module 802 may be sent to one or more applications, represented by application server(s) 125. The NLU results 385 and the user recognition confidence data 811 may be sent simultaneously (i.e., in a single transmission) to the application server(s) 125 via an application program interface (API). Alternatively, the NLU results 385 and the user recognition confidence data 811 may be sent in consecutive transmissions to the application server(s) 125 via the API. The application server(s) 125 that receives the NLU results 385 and the user recognition confidence score data 811 may be determined by the server(s) 120 as corresponding to content responsive to the utterance in the audio data 111. For example, if the audio data 111 includes the utterance "Play my music," the NLU results 385 and user recognition confidence data 811 may be sent to a music playing application server 125. If user recognition confidence data 811 associated with a single user is passed to the application server(s) 125, the application server(s) 125 may identify content responsive to the utterance and associated with the user. If, instead, user recognition confidence score data 811 associated with multiple users is passed to the application server(s) 125, the application server(s) 125 may identify content responsive to the utterance and associated with the user associated with the highest recognition confidence.

The API used to pass the user recognition confidence data 811 to the application server(s) 125 may allow the application server(s) 125 to receive various information such a user ID as well as a confidence value corresponding to the user ID, such as a numeric value or binned value as discussed herein. The API may also pass data corresponding to or representing the confidence value such as a binned value discussed herein or other data, numeric or otherwise representing the confidence. The API may also pass other data such as a source of user recognition data (e.g., whether the system recognized the user using speech analysis, a passcode, a passphrase, a fingerprint, biometric data, etc. or some combination thereof). The API may also pass data such as other user profile information, a speech session identifier (so the various components can track the speech session corresponding to the data) or other information. The speech session identifier may correspond to an utterance spoken by a user and/or to an ongoing exchange between the system and the user (such as a dialog of multiple utterances) to exchange information for executing a command. The API, or one or more other APIs, may also be used to exchange the user recognition confidence thresholds sent from the application server(s) 125 to the user recognition module 802 as well as other data such as requested specific sources of user recognition data, user IDs, speech session IDs, requested content data, or other information to be exchanged for purposes of processing a speech command/session.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Different content sources may require different user recognition confidence level thresholds be satisfied prior to creating/releasing user specific content. For example, if a user says "What is my bank account balance", an output of the system may ultimately be "Hello John, your Bank A account balance is $500." The portion of the output corresponding to "Hello John" may be created by a TTS content source that requires a user recognition confidence threshold of "low" be satisfied since potentially speaking the wrong user's name in a greeting is not necessarily problematic from a confidentiality perspective. In contrast, the portion of the output corresponding to "your Bank A account balance is $500" may be created using output from a banking content source (e.g., an application server 125) that requires a user recognition confidence threshold of "high" be satisfied because divulging a bank and an account balance of a user to a wrong user is highly problematic from a confidentiality perspective.

Moreover, a single content source may require different user recognition confidence level thresholds be satisfied based on the type/kind of content to be released. For example, a banking application may be configured to create/release bank branch information (e.g., branch locations and times of operation). The banking application may also be configured to release bank account information. The banking application may require a user recognition confidence level of "low" be satisfied to release bank branch information, but may require a user recognition confidence level of "high" be satisfied to release user specific bank account information.

Figure 9A:
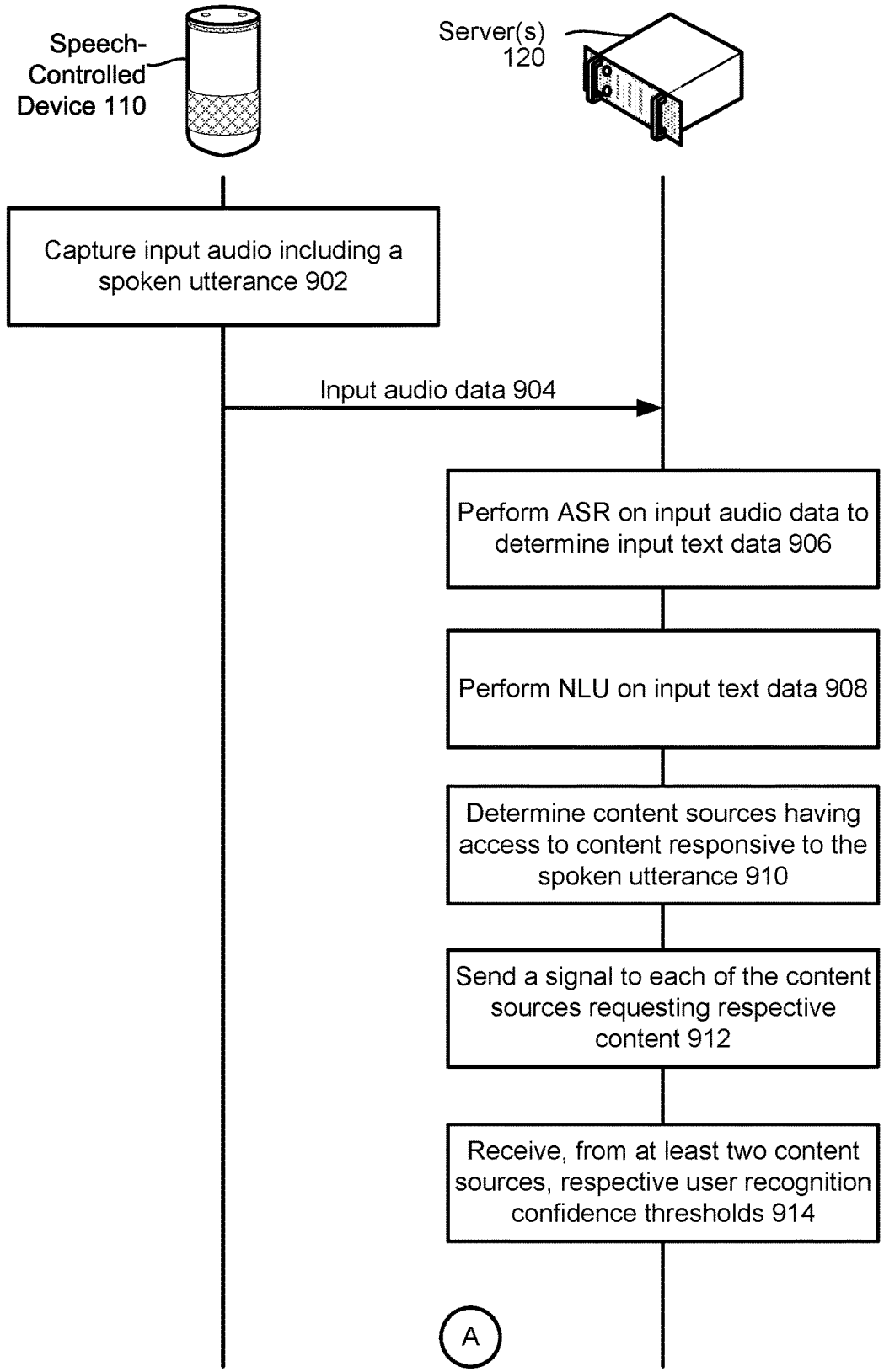
Figure 9B:
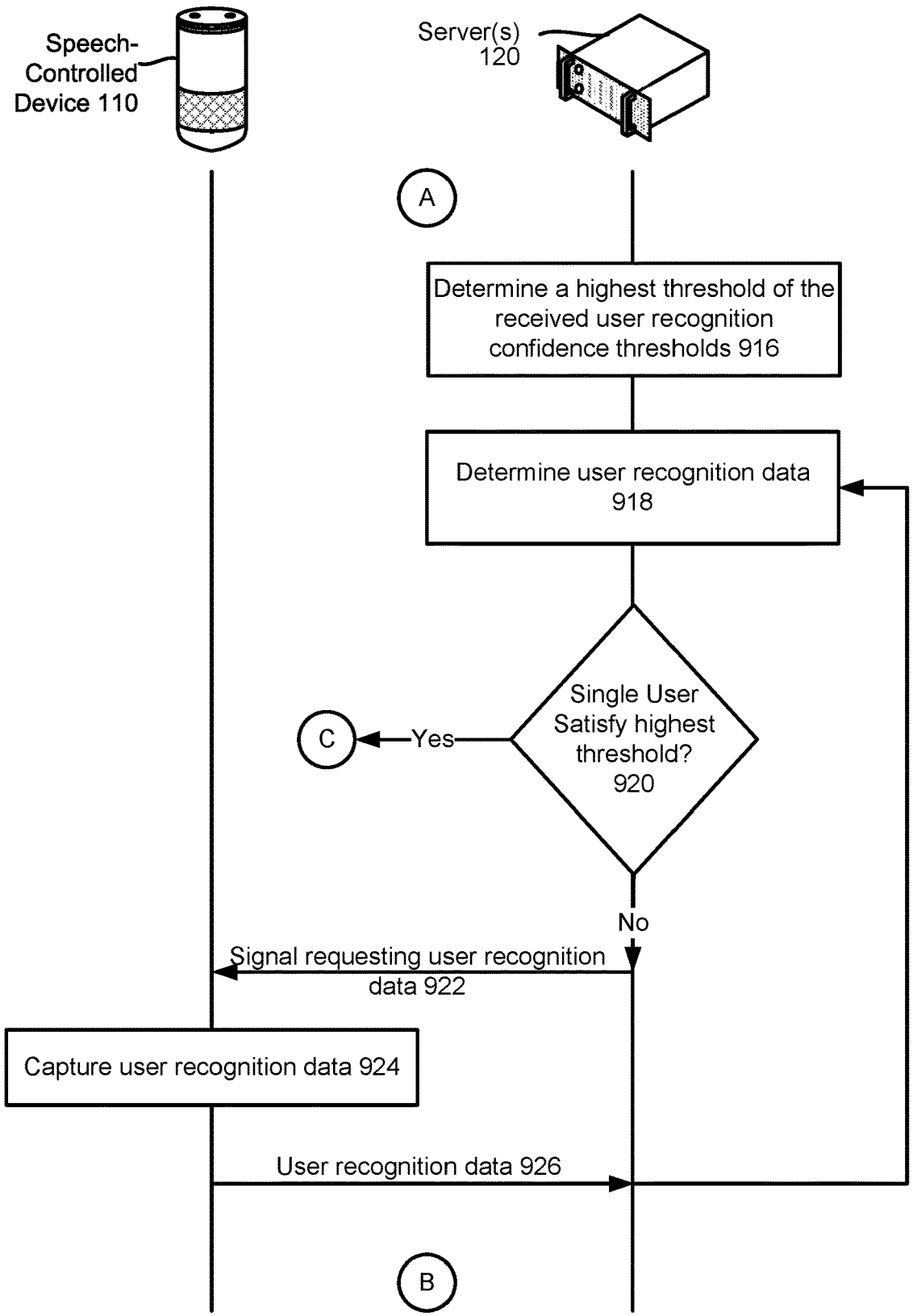

FIGS. 9A through 9C illustrate user recognition involving a feedback loop for gathering addition user recognition data where needed, and wherein user recognition confidence thresholds are received from content sources. The speech-controlled device 110 captures (902) input audio including a spoken utterance. The speech-controlled device 110 sends (904) input audio data, corresponding to the input audio, to the server(s) 120.

The server(s) 120 may perform (906) ASR on the input audio data to determine input text data. The server(s) 120 may also perform (908) NLU on the input text data. Using output of the NLU processing, the server(s) 120 (namely a component of the server(s) 120 such as the command processor(s) 290) may determine (910) one or multiple content sources storing or having access to content responsive to the spoken utterance. For example, the NLU output may relate to multiple domains (e.g., music, video, books, etc.), and each content source may be associated with a respective domain. The server(s) 120 may send (912) a signal to each determined content source (e.g., command processor 290/application server 125 associated with the domain/command to be executed), with the signal requesting respective content from the content source. The command processor 290/content source may be located within the system or may be associated with an application server 125 (not illustrated).

The server(s) 120 (e.g., the user verification module 802) may receive (914) a respective user recognition confidence threshold from each content source. Alternatively, the server(s) 120 may determine user recognition confidence threshold data associated with each content source within a lookup table. This user recognition confidence threshold may relate to the command to be performed and/or to the content data to be obtained. In certain examples, a single content source may return multiple different user recognition confidence thresholds, where each threshold corresponds to certain content data that may result from the utterance. The server(s) 120 may, using the user recognition data, determine (916 illustrated in FIG. 9B) a highest (i.e., most stringent) user recognition confidence threshold of those received from the content sources. The server(s) 120 may determine (918) user recognition data for a single user indicated in a profile associated with the speech-controlled device 110 (i.e., the user associated with the highest recognition confidence determined by the user recognition module 802). The server(s) 120 may also determine (920) whether the highest user recognition confidence threshold is satisfied (i.e., whether the system has sufficiently verified the user associated with the input utterance so that the user recognition confidence meets or exceeds the highest user recognition confidence threshold from the group of content sources). If the user recognition data does not meet or exceed the highest user recognition confidence threshold, the server(s) 120 may send (922) a signal to the speech-controlled device 110 (or another device associated with the speech-controlled device 110, such as other recognition devices such as biometric sensors) to obtain additional user recognition data. The additional user recognition data may include, for example, image data or video data usable to perform facial recognition, fingerprint data usable to perform fingerprint verification, retina image data usable to perform retina verification, etc. The speech-controlled device 110 (and/or another device) captures (924) additional user recognition data and sends (926) the additional user recognition data to the server(s) 120. The server(s) 120 then repeats steps 9918 and 920. For example, the server(s) 120 may determine a biometric device (or other device) associated with the profile of the speech-controlled device 110. The server(s) 120 may then cause the recognition device (which may be device 110 or a different device) to capture and/or send recognition data. The server(s) 120 may receive the recognition data, and may compare it to stored recognition data associated with users indicated in the profile of the speech-controlled device 110. Based on the comparison, the server(s) 120 may update the user recognition data.

If the server(s) 120 (either originally or after gathering additional user recognition data) determines the user recognition data meets or exceeds the highest user recognition confidence threshold, the server(s) 120 sends (928 illustrated in FIG. 9C) a signal indicating the user and associated recognition data to all of the content sources. The signal may include specific recognition confidence data (such as a confidence score or a confidence indicator) associated with the user. Alternatively, the signal may simply indicate the user associated with user recognition data that meets or exceeds the highest threshold.

The server(s) 120 may thereafter receive (930) content from the respective content sources, and send (932) the content to the speech-controlled device 110. The content received from the content sources may be in the form of text data. The speech-controlled device 110 may then output (934) content corresponding to the text data. For example, the server(S) 120 may perform TTS on the received text data to create output audio data, and the output audio data may be sent to and output from the speech-controlled device 110.

For example, the server(s) 120 may perform NLU on input audio data, and may determine a TTS prompter and a bank application should be used to generate output audio responsive to the input audio data. The server(s) 120 may also determine that the TTS prompter requires a low user recognition confidence threshold be satisfied, and that the bank application requires a high user recognition confidence threshold be satisfied. The server(s) 120 may then perform audio based user recognition using the input audio data, and determine a high user recognition confidence. Thereafter, the server(s) 120 may indicate, to both the TTS prompter and the bank application, that their thresholds have been satisfied (with or without indicating the specifics of the generated confidence, that is a high confidence). The TTS prompter and bank application may then provide respective data, and the server(s) 120 may output responsive content to the user.

For further example, the server(s) 120 may perform NLU on input audio data, and may determine a TTS prompter and a bank application should be used to generate output audio responsive to the input audio data. The server(s) 120 may also determine that the TTS prompter requires a low user recognition confidence threshold be satisfied, and that the bank application requires a high user recognition confidence threshold be satisfied. The server(s) 120 may then perform audio based user recognition using the input audio data, and determine a medium user recognition confidence. Thus, rather than allow only a portion of a responsive output be generated (since the medium confidence is sufficient for the TTS prompter but insufficient for the bank application), the server(s) 120 may cause the speech-controlled device 110 (or another device) to prompt the user for additional recognition data. Such a prompt may include, for example, "Please provide an additional verification input so that I may more accurately verify you." The server(s) 120 may use the additional recognition data in conjunction with the previous audio recognition to determine a user confidence of high. The server(s) 120 may then indicate, to both the TTS prompter and the bank application, that their thresholds have been satisfied (with or without indicating the specifics of the generated confidence, that is a high confidence). The TTS prompter and bank application may then provide respective data, and the server(s) 120 may output responsive content to the user.

Figure 10:
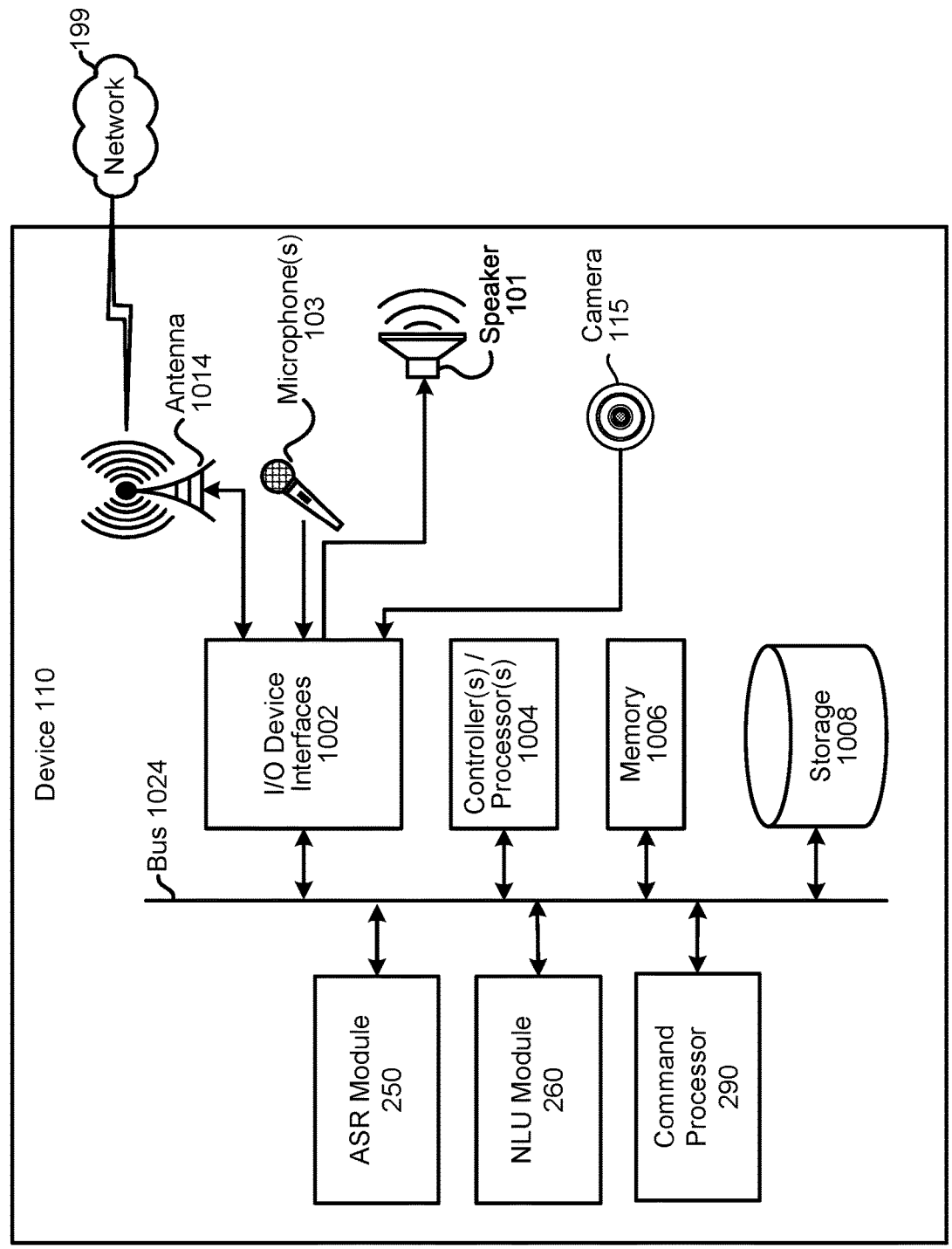
FIG. 10 is a block diagram conceptually illustrating example components of a device according to embodiments of the present disclosure.
Figure 11:
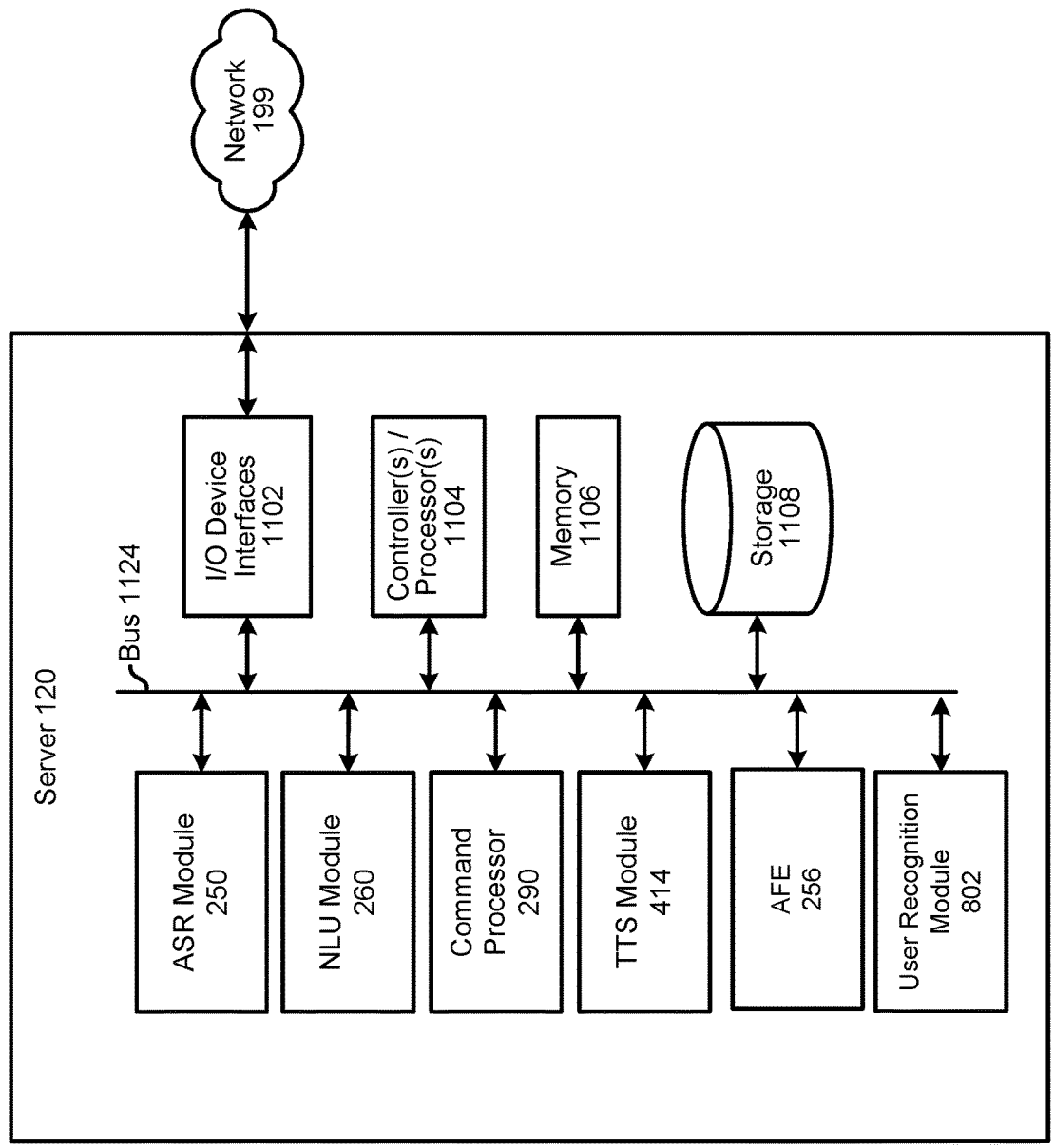
FIG. 11 is a block diagram conceptually illustrating example components of a server according to embodiments of the present disclosure.

FIG. 10 is a block diagram conceptually illustrating a user device 110 (e.g., the speech-controlled device 110 described herein) that may be used with the described system. FIG. 11 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1004/1104), that may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive (MRAM) and/or other types of memory. Each device (110/120) may also include a data storage component (1008/1108), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 101, a wired headset or a wireless headset (not illustrated), or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array. The device 110 may additionally include an image or video capture component, such as the camera 115. The camera 115 may be configured to capture data used to perform facial recognition, and ultimately user recognition.

For example, via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to FIG. 11, the server 120 may include a user recognition module 802 configured to perform user recognition as described herein. The server 120 may also be configured with the TTS module 414, AFE 256, or other components as described herein.

The device 110 and/or the server 120 may include an ASR module 250. The ASR module 250 in the device 110 may be of limited or extended capabilities. The ASR module 250 may include the language models 254 stored in ASR model storage component 252. If limited speech recognition is included, the ASR module 250 may be configured to identify a limited number of words, whereas extended speech recognition may be configured to recognize a much larger range of words.

The device 110 and/or the server 120 may include a limited or extended NLU module 260. The NLU module 260 in the device 110 may be of limited or extended capabilities. The NLU module 260 may comprise the name entity recognition module 262, the intent classification module 264, and/or other components. The NLU module 260 may also include a stored knowledge base and/or entity library, or those storages may be separately located.

The device 110 and/or the server 120 may also include the command processor 290 configured to execute commands/functions associated with a spoken utterance as described herein.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 10 and 11, are exemplary, and may be located as a stand-alone device or may be included, in whole or in part, as a component of a larger device or system.

Figure 12:
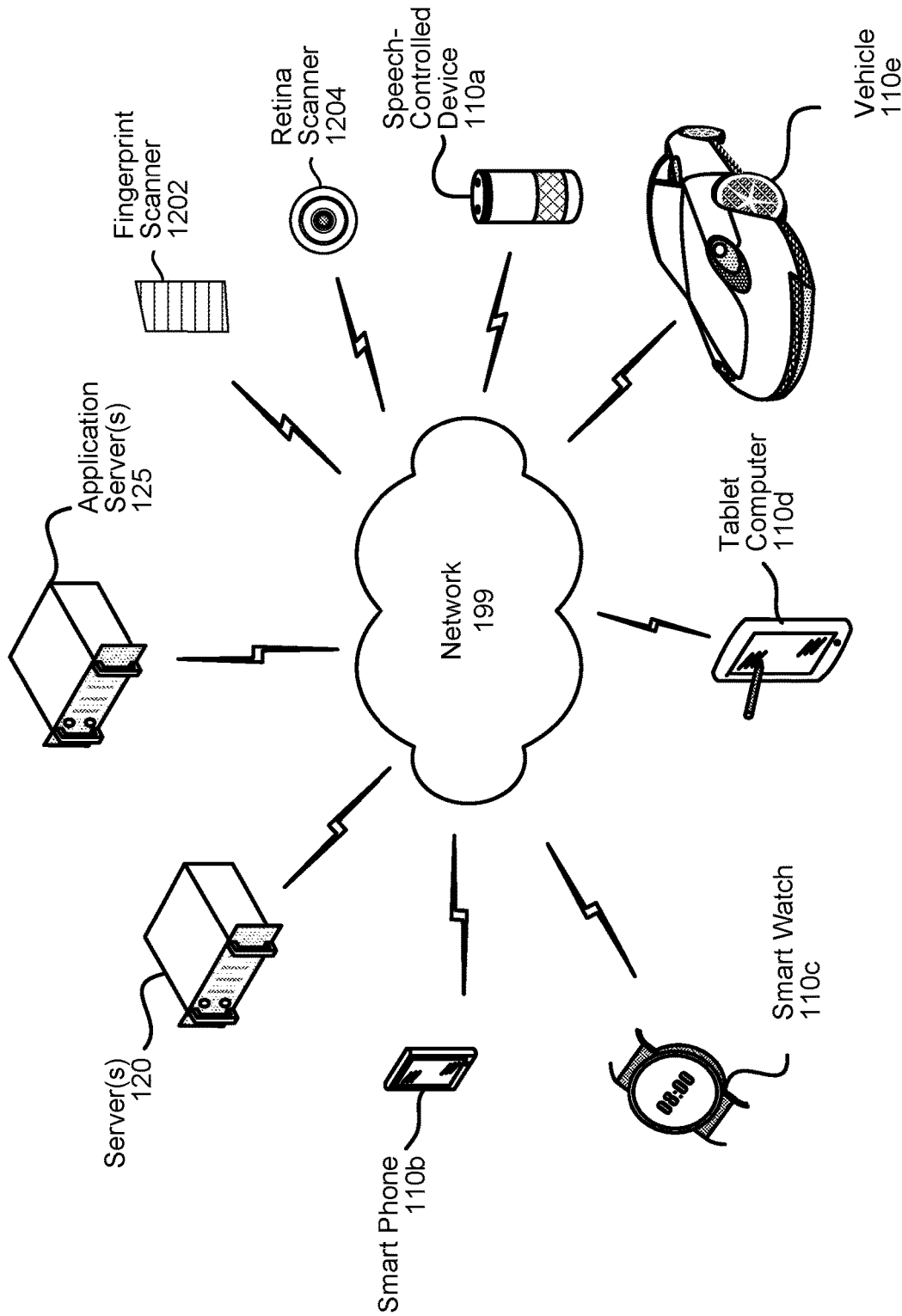
FIG. 12 illustrates an example of a computer network for use with the system.

As illustrated in FIG. 12, multiple devices (120, 110a-110e, 1202, 1204) may contain components of the system 100 and the devices may be connected over a network 199. The network 199 may include a local or private network or may include a wide network such as the Internet. Devices may be connected to the network 199 through either wired or wireless connections. For example, the speech-controlled device 110a, a smart phone 110b, a smart watch 110c, a tablet computer 110d, and/or a vehicle 110e may be connected to the network 199 through a wireless service provider, over a WiFi or cellular network connection, or the like. Other devices are included as network-connected support devices, such as the server 120 or others. Other devices are included as network-connected biometric sensors, such as a fingerprint scanner 1102, a retina scanner 1104, and the like. The support devices may connect to the network 199 through a wired connection or wireless connection. Networked devices may capture audio using one-or-more built-in or connected microphones 103 or audio capture devices, with processing performed by ASR, NLU, or other components of the same device or another device connected via the network 199, such as the ASR module 250, the NLU module 260, etc. of one or more servers 120.

The concepts disclosed herein may be applied within a number of different devices and computer systems, including, for example, general-purpose computing systems, speech processing systems, object recognition (e.g., facial recognition) systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, speech processing, object recognition (e.g., facial recognition), and user recognition should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving input audio data representing first speech;
processing the input audio data to determine the first speech was spoken by a first user;
causing speech processing to be performed using the input audio data to determine a request; and
based at least in part on the first speech being spoken by the first user, causing output of content responsive to the request.

2. The computer-implemented method of claim 1, wherein the first speech includes a wakeword.

3. The computer-implemented method of claim 1, wherein processing the input audio data to determine the first speech was spoken by a first user comprises:
processing the input audio data with respect to stored data corresponding to a user profile to determine output data; and
based at least in part on the output data, determining the first speech was spoken by the first user.

4. The computer-implemented method of claim 3, wherein processing the input audio data with respect to stored data comprises processing the input audio data with respect to feature data associated with the first user.

5. The computer-implemented method of claim 1, further comprising:
determining a user recognition condition corresponding to the request; and
based at least in part on the processing of the input audio data, determining that the user recognition condition is satisfied.

6. The computer-implemented method of claim 1, further comprising:
determining the request corresponds to a first component; and
sending, to the first component, first data indicating identification of the first user.

7. The computer-implemented method of claim 1, further comprising:
capturing, by a first device, first audio corresponding to the first speech,
wherein causing speech processing to be performed comprises sending, from the first device to a second device, the input audio data.

8. The computer-implemented method of claim 1, further comprising:
processing the input audio data to determine the first speech includes a wakeword,
wherein causing output of the content responsive to the request is further based at least in part on the first speech including the wakeword.

9. The computer-implemented method of claim 1, wherein the input audio data is received from a first device and the method further comprises:
determining stored data associated with the first device, the stored data corresponding to a voice of a second user; and
processing the input audio data with respect to the stored data to determine the first speech was not spoken by the second user.

10. The computer-implemented method of claim 1, wherein the input audio data is received from a first device and the method further comprises:
receiving, from the first device, image data; and
processing the image data to determine a representation of a face of the first user, wherein causing output of content responsive to the request is further based at least in part on determination of the representation of the face of the first user.

11. A system comprising:
at least one processor; and
at least one memory comprising instructions that, when executed by the at least one processor, cause the system to:
receive input audio data representing first speech;
process the input audio data to determine the first speech was spoken by a first user;
cause speech processing to be performed using the input audio data to determine a request; and
based at least in part on the first speech being spoken by the first user, cause output of content responsive to the request.

12. The system of claim 11, wherein the first speech includes a wakeword.

13. The system of claim 11, wherein the instructions that cause the system to process the input audio data to determine the first speech was spoken by a first user comprise instructions that, when executed by the at least one processor, cause the system to:
process the input audio data with respect to stored data corresponding to a user profile to determine output data; and
based at least in part on the output data, determine the first speech was spoken by the first user.

14. The system of claim 13, wherein the instructions that cause the system to process the input audio data with respect to stored data comprise instructions that, when executed by the at least one processor, cause the system to process the input audio data with respect to feature data associated with the first user.

15. The system of claim 11, wherein the at least one memory further comprises instructions that, when executed by the at least one processor, further cause the system to:
determine a user recognition condition corresponding to the request; and
based at least in part on the processing of the input audio data, determine that the user recognition condition is satisfied.

16. The system of claim 11, wherein the at least one memory further comprises instructions that, when executed by the at least one processor, further cause the system to:
determine the request corresponds to a first component; and
send, to the first component, first data indicating identification of the first user.

17. The system of claim 11, wherein the at least one memory further comprises instructions that, when executed by the at least one processor, further cause the system to:
capture, by a first device, first audio corresponding to the first speech,
wherein the instructions that cause the system to cause speech processing to be performed comprise instructions that, when executed by the at least one processor, cause the system to send, from the first device to a second device, the input audio data.

18. The system of claim 11, wherein the at least one memory further comprises instructions that, when executed by the at least one processor, further cause the system to:
process the input audio data to determine the first speech includes a wakeword,
wherein the instructions that cause the system to cause output of the content responsive to the request are further based at least in part on the first speech including the wakeword.

19. The system of claim 11, wherein the input audio data is received from a first device and the at least one memory further comprises instructions that, when executed by the at least one processor, further cause the system to:
determine stored data associated with the first device, the stored data corresponding to a voice of a second user; and
process the input audio data with respect to the stored data to determine the first speech was not spoken by the second user.

20. The system of claim 11, wherein the input audio data is received from a first device and the at least one memory further comprises instructions that, when executed by the at least one processor, further cause the system to:
receive, from the first device, image data; and
process the image data to determine a representation of a face of the first user,
wherein the instructions that cause the system to cause output of the content responsive to the request are further based at least in part on determination of the representation of the face of the first user.

* * * * *